(12) United States Patent
Yoon et al.

(10) Patent No.: US 12,107,693 B2
(45) Date of Patent: *Oct. 1, 2024

(54) METHOD OF CONTROLLING DISPLAY DEVICE, AND DISPLAY DEVICE USING THE METHOD

(71) Applicant: SAMSUNG ELECTRONICS CO., LTD., Suwon-si (KR)

(72) Inventors: Sukun Yoon, Suwon-si (KR); Sangmin Kim, Suwon-si (KR); Youngseok Ko, Suwon-si (KR); Younghoon Moon, Suwon-si (KR); Jin Seol, Suwon-si (KR); Cheulhee Hahm, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 385 days.

This patent is subject to a terminal disclaimer.

(21) Appl. No.: 17/557,240

(22) Filed: Dec. 21, 2021

(65) Prior Publication Data

US 2022/0116239 A1 Apr. 14, 2022

Related U.S. Application Data

(63) Continuation of application No. 16/558,744, filed on Sep. 3, 2019, now Pat. No. 11,212,123.

(30) Foreign Application Priority Data

Sep. 4, 2018 (KR) .................. 10-2018-0105317

(51) Int. Cl.
*H04L 12/12* (2006.01)
*H04W 52/02* (2009.01)
*H04W 76/14* (2018.01)

(52) U.S. Cl.
CPC ......... *H04L 12/12* (2013.01); *H04W 52/0229* (2013.01); *H04W 76/14* (2018.02)

(58) Field of Classification Search
CPC .. H04L 12/12; H04W 52/0229; H04W 76/14; H04W 4/80; H04M 1/72412;
(Continued)

(56) References Cited

U.S. PATENT DOCUMENTS 9,521,235 B2 12/2016 Park
10,007,325 B2 6/2018 Moon
(Continued)

FOREIGN PATENT DOCUMENTS

CN 104333785 A 2/2015
CN 105681969 A 6/2016
(Continued)

OTHER PUBLICATIONS

India Examination Report dated Feb. 1, 2022 for IN Application No. 202117010514.
(Continued)

*Primary Examiner* — Jinsong Hu
*Assistant Examiner* — Rui M Hu
(74) *Attorney, Agent, or Firm* — Nixon & Vanderhye P.C.

(57) ABSTRACT

Provided is a display device including a display, a speaker, a communicator comprising communication circuitry configured to perform wireless communication, a memory configured to store one or more instructions, and a controller including at least one processor configured to execute at least one of the one or more instructions. Based on a wireless connection request for audio transmission being received from an external device while the display device is in a power-off state, the communicator is further configured to transmit, to the external device, a response indicating acceptance of the wireless connection request, and to operate to wake up the controller to a state requiring wireless connection.

16 Claims, 14 Drawing Sheets

(58) Field of Classification Search
CPC .......... H04M 1/72442; H04M 2250/02; H04N 21/4126; H04N 21/43637; H04N 21/4436; H04N 21/4222; H04N 21/42221; H04N 21/436; H04N 21/4432; G06F 3/16; G06F 1/3228; G06F 3/14
See application file for complete search history.

(56) References Cited

U.S. PATENT DOCUMENTS

| | | | |
|---|---|---|---|
| 10,306,397 B2* | 5/2019 | La | H04W 88/02 |
| 10,368,314 B2* | 7/2019 | Hashimoto | H04W 52/028 |
| 10,805,571 B2 | 10/2020 | Takagaki | |
| 11,212,123 B2* | 12/2021 | Yoon | H04M 1/72412 |
| 2010/0057233 A1* | 3/2010 | Suzuki | H04W 52/0241 |
| | | | 700/94 |
| 2011/0016415 A1 | 1/2011 | Nam | |
| 2012/0020265 A1 | 1/2012 | Wu et al. | |
| 2012/0235896 A1 | 9/2012 | Jacobsen et al. | |
| 2012/0329396 A1 | 12/2012 | Matsushita | |
| 2013/0113710 A1* | 5/2013 | Choi | H04W 52/0296 |
| | | | 345/169 |
| 2013/0290762 A1 | 10/2013 | Pawar | |
| 2014/0342670 A1* | 11/2014 | Kang | H04L 69/14 |
| | | | 455/67.11 |
| 2015/0015380 A1 | 1/2015 | Choi et al. | |
| 2015/0039482 A1* | 2/2015 | Fujinaga | H02J 50/10 |
| | | | 307/104 |
| 2015/0271432 A1 | 9/2015 | Muth | |
| 2015/0301574 A1 | 10/2015 | Kim | |
| 2016/0016079 A1* | 1/2016 | Kuroume | A63F 13/42 |
| | | | 463/31 |
| 2016/0019781 A1* | 1/2016 | Lee | G08C 17/02 |
| | | | 340/12.5 |
| 2016/0162015 A1 | 6/2016 | Moon | |
| 2016/0163335 A1 | 6/2016 | Jo et al. | |
| 2016/0227600 A1 | 8/2016 | Shedletsky et al. | |
| 2016/0239062 A1* | 8/2016 | Lee | H04N 21/4383 |
| 2017/0026686 A1 | 1/2017 | Glazier et al. | |
| 2017/0078610 A1* | 3/2017 | Yang | G06F 3/016 |
| 2017/0110005 A1* | 4/2017 | Yang | G08C 23/04 |
| 2017/0180918 A1* | 6/2017 | Yang | H04N 5/63 |
| 2017/0193815 A1 | 7/2017 | Lee et al. | |
| 2017/0207859 A1 | 7/2017 | Kim | |
| 2017/0374487 A1* | 12/2017 | La | H04W 52/0235 |
| 2018/0088901 A1 | 3/2018 | Dririkwater | |
| 2018/0103229 A1 | 4/2018 | Yang et al. | |
| 2018/0124847 A1 | 5/2018 | Nishida | |
| 2018/0278728 A1 | 9/2018 | Kongovi | |
| 2018/0324562 A1 | 11/2018 | Park | |
| 2018/0338107 A1 | 11/2018 | Yang et al. | |
| 2019/0086991 A1* | 3/2019 | Lee | H04N 21/6543 |
| 2019/0089925 A1* | 3/2019 | Lee | H04N 5/642 |
| 2019/0132305 A1 | 5/2019 | Liu | |
| 2019/0297712 A1 | 9/2019 | Chema | |
| 2020/0068059 A1* | 2/2020 | Hwang | H04W 4/80 |
| 2020/0076631 A1* | 3/2020 | Yoon | H04N 21/4126 |
| 2021/0219118 A1* | 7/2021 | Chen | H04N 21/4436 |

FOREIGN PATENT DOCUMENTS

| | | |
|---|---|---|
| CN | 107534787 A | 1/2018 |
| EP | 3029650 | 6/2016 |
| KR | 10-2010-0053106 A | 5/2010 |
| KR | 10-2016-0009346 | 1/2016 |
| KR | 10-1592755 | 2/2016 |
| KR | 10-2016-0023742 | 3/2016 |
| KR | 10-2016-0067625 | 6/2016 |
| KR | 10-2017-0033172 | 3/2017 |
| KR | 10-2017-0073257 | 6/2017 |
| WO | WO 2016/129216 | 8/2016 |

OTHER PUBLICATIONS

Japanese Office Action dated May 23, 2022 for JP Application No. 2021-537016.
European Notice of Allowance dated Feb. 20, 2023 for EP Application No. 21152999.5.
Korean Office Action dated May 15, 2023 for KR Application No. 10-2018-0105317.
U.S. Appl. No. 16/558,744, filed Sep. 3, 2019; Yoon et al.
Chinese Office Action dated Apr. 2, 2021 for CN Application No. 201910834817.1.
International Search Report and Written Opinion mailed Dec. 4, 2019 in counterpart International Application No. PCT/KR2019/011343.
Extended Search Report mailed Oct. 17, 2019 in counterpart European Patent Application No. 19195413.0.
Korean Notice of Allowance dated Dec. 26, 2023 for KR Application No. 10-2018-0105317.

* cited by examiner

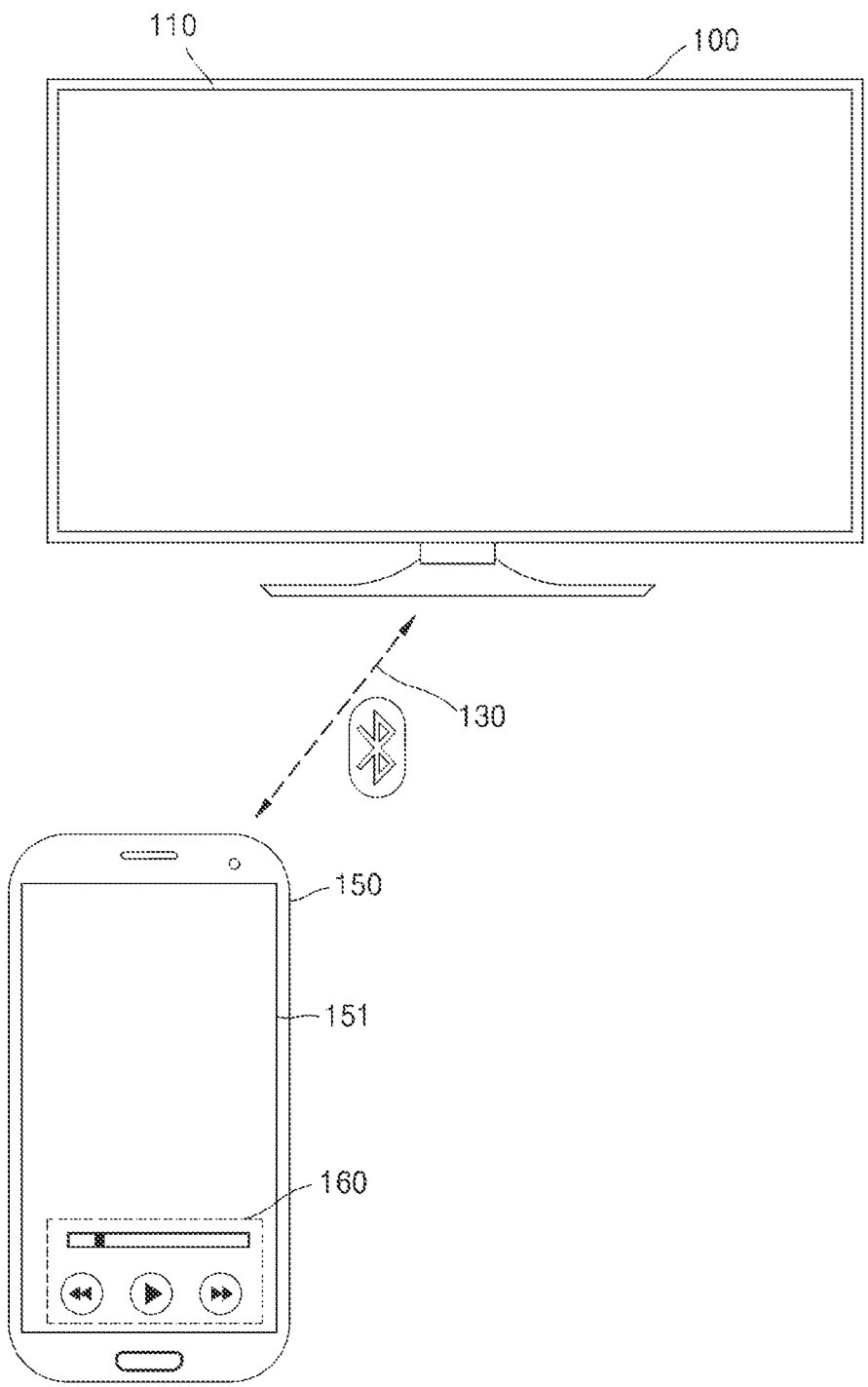

METHOD OF CONTROLLING DISPLAY DEVICE, AND DISPLAY DEVICE USING THE METHOD

CROSS-REFERENCE TO RELATED APPLICATION

This application is a Continuation of U.S. application Ser. No. 16/558,744, filed Sep. 3, 2019 (now U.S. Pat. No. 11,212,123), which claims priority to KR 10-2018-0105317, filed on Sep. 4, 2018, the entire contents of which are all hereby incorporated herein by reference in their entireties.

BACKGROUND

1. Field

The disclosure relates to a method of controlling a display device, and a display device using the method.

For example, the disclosure relates to a method of controlling a display device communicating with an external device through a wireless connection, and a display device using the method. Herein, the wireless connection may be a Bluetooth connection.

For example, the disclosure relates to a method of controlling a display device capable of performing sound mirroring with an external device through a wireless connection, and a display device using the method.

2. Description of Related Art

Due to the popularization of electronic devices such as mobile devices, technologies for interconnecting a plurality of electronic devices through a wireless communication network and cooperatively operating the plurality of connected electronic devices are being developed. Herein, the plurality of electronic devices may include, for example, portable devices carriable by users, and home appliances.

The wireless communication network may be a communication network through which wireless communication may be performed within a short distance according to the Bluetooth communication standards. For example, an electronic device connected to a mobile device through a Bluetooth network may transmit and receive data to and from the mobile device. The electronic device may be a display device.

The display device is connected to an external device such as the mobile device through the Bluetooth network, and performs data communication based on a mirroring technology. The mirroring technology may include, for example, sound mirroring for sharing sound signals, and screen mirroring for sharing a screen.

The display device is being developed to provide various functions and/or services to reflect various desires of users (e.g., a desire to receive a specific service). An example of users' desires may include a desire for sound mirroring to be performed between any one device (e.g., a mobile device of a user) and the display device. A user may desire to Bluetooth-connect a Bluetooth (BT) speaker to a source device (e.g., a mobile phone) for providing music to the BT speaker, and to listen to the music reproduced by the source device, through the BT speaker. The user may desire to use a sound mirroring service through the display device having higher sound reproduction quality than a certain electronic device (e.g., the mobile phone).

In this case, a display device capable of conveniently and rapidly performing a sound mirroring operation to meet the above-described desires of the user needs to be developed and provided.

SUMMARY

Embodiments of the disclosure provide a method of controlling a display device capable of performing sound mirroring with an external device connected through a wireless network (for example, Bluetooth network), and a display device using the method.

A method of controlling a display device is provided, the method being capable of performing wireless connection for audio transmission between the display device and an external device even when the display device is in a power-off state, and a display device using the method.

Additional aspects will be set forth in part in the description which follows and, in part, will be apparent from the description.

A display device according to an example embodiment of the disclosure includes a display, a speaker, a communicator comprising communication circuitry configured to perform wireless communication, a memory configured to store one or more instructions, and a controller including at least one processor configured to execute at least one of the one or more instructions. Based on a wireless connection request for audio transmission being received from an external device while the display device is in a power-off state, the communicator is further configured to transmit, to the external device, a response indicating acceptance of the wireless connection request, and to control the display device to operate to wake up the controller to a state requiring wireless connection. According to the above-described example embodiment of the disclosure, even in the power-off state, the display device according to an example embodiment of the disclosure may perform an operation for wireless connection without ignoring the wireless connection request received from the external device. Herein, the wireless communication may be Bluetooth communication, and the wireless connection request may be Bluetooth connection request Based on a history of performing Bluetooth connection between the display device and the external device being present, the communicator may be further configured to transmit the response to the external device. According to the above-described example embodiment of the disclosure, the display device according to an example embodiment of the disclosure may be configured to perform Bluetooth connection based on a connection history. As such, the display device may rapidly and conveniently perform Bluetooth connection to the external device having been previously paired with the display device.

Based on the Bluetooth connection request being received, the communicator may be further configured to operate in such a manner that the display device performs a background power-on operation, and transmit, to the controller, a reason corresponding to the background power-on operation. The controller may be configured to obtain connection information for Bluetooth connection to the external device, and perform Bluetooth connection to the external device, based on the reason and the connection information.

The connection information may include a Bluetooth a media access control (BT MAC) address of the external device.

Based on the Bluetooth connection request being received, the communicator may be further configured to operate in such a manner that the display device performs a background power-on operation. Based on the background power-on operation being performed, the controller may be configured to perform Bluetooth connection for sound mirroring, based on a reason corresponding to the background power-on operation. According to the above-described example embodiment of the disclosure, the display device according to an example embodiment of the disclosure may be maintained in a screen-off state before Bluetooth connection, by performing Bluetooth connection after the background power-on operation. As such, the screen-off state may be maintained before Bluetooth connection is completed and sound mirroring is started, and thus power consumption for displaying a screen may be minimized and/or reduced.

The communicator may include a Bluetooth communicator. The Bluetooth communicator may include a Bluetooth module including Bluetooth circuitry configured to transmit and/or receive a Bluetooth signal, and store first information corresponding to Bluetooth connection information of devices having been Bluetooth-connected to the display device, and a Bluetooth processor configured to operate when the display device is powered on, and store the first information.

Based on the Bluetooth connection request being received while the display device is in the power-off state, and based on the Bluetooth connection information of the external device corresponding to the first information, the Bluetooth module may be further configured to control the response to be transmitted to the external device.

The Bluetooth module may be further configured to wake up the controller based on the Bluetooth connection information of the external device corresponding to the first information. The controller may be configured to be awakened by the Bluetooth module, and control the display device to perform a background power-on operation. According to the above-described example embodiment of the disclosure, the display device according to an example embodiment of the disclosure may perform an operation corresponding to the Bluetooth connection request received from the external device, even in a low power mode (LPM) because the Bluetooth module checks an external device having legally completed Bluetooth connection and thus wakes up the controller.

The Bluetooth module may be further configured to perform an operation related to Bluetooth connection, in a low power mode (LPM), and the Bluetooth processor may be further configured to perform an operation related to Bluetooth connection, in a host controller interface (HCI) mode.

The Bluetooth module may be further configured to wake up the controller and disconnect Bluetooth communication to the external device performed in a LPM mode, based on the first information corresponding to the Bluetooth connection information of the external device. The Bluetooth processor may be further configured to perform an operation for connecting Bluetooth communication to the external device, in the HCI mode.

The controller may be configured to transmit, to the external device, information indicating that an operation for reconnecting the Bluetooth communication is performed after disconnection. According to the above-described example embodiment of the disclosure, the display device according to an example embodiment of the disclosure transmits, to the external device, the information indicating that the reconnection operation is performed. As such, the external device may not recognize temporary loss of Bluetooth connection as a Bluetooth connection error.

The Bluetooth connection request for audio transmission may include a connection request for sound mirroring through Bluetooth communication.

The controller may be configured to: be awakened by the Bluetooth module, control the display device to perform a background power-on operation, complete Bluetooth connection to the external device, and control a sound mirroring service to be automatically performed.

The audio transmission may be audio transmission for sound mirroring, the external device may operate as a source device for the sound mirroring, and the display device may operate as a sink device for the sound mirroring. According to the above-described example embodiment of the disclosure, even in the power-off state, the display device according to an example embodiment of the disclosure may perform an operation corresponding to the Bluetooth connection request received from the external device, and perform sound mirroring.

A method of controlling a display device, according to an example embodiment of the disclosure, the display device including a display, a speaker, a communicator comprising communication circuitry configured to perform Bluetooth communication, a memory configured to store one or more instructions, and a controller including at least one processor configured to execute at least one of the one or more instructions. The method includes: receiving, by the communicator from an external device, a Bluetooth connection request for audio transmission, based on the display device being in a power-off state, transmitting, by the communicator to the external device, a response indicating acceptance of the Bluetooth connection request, in response to the Bluetooth connection request, and controlling, by the communicator, the controller to wake up to a state requiring Bluetooth connection, in response to the Bluetooth connection request. According to the above-described example embodiment of the disclosure, in the method of controlling the display device, according to an example embodiment of the disclosure, even when the display device is in the power-off state, an operation for Bluetooth connection may be performed without ignoring the Bluetooth connection request received from the external device.

The transmitting of the response may include transmitting, by the communicator, the response to the external device based on a history of performing Bluetooth connection between the display device and the external device being present. According to the above-described example embodiment of the disclosure, in the method of controlling the display device, according to an example embodiment of the disclosure, Bluetooth connection is performed based on a connection history. As such, the display device may rapidly and conveniently perform Bluetooth connection to the external device having been previously paired with the display device.

The method may further include performing, by the display device, a background power-on operation based on the Bluetooth connection request being received, obtaining a reason corresponding to the background power-on operation, and connection information for Bluetooth connection to the external device, and performing, by the controller, Bluetooth connection to the external device, based on the reason and the connection information.

The method may further include completing, by the controller of the display device, Bluetooth connection to the external device, and automatically performing a sound mirroring service through the Bluetooth connection.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 1 is a diagram illustrating example sound mirroring between a display device and an external device, according to an embodiment of the disclosure;

DETAILED DESCRIPTION

Figure 2A:
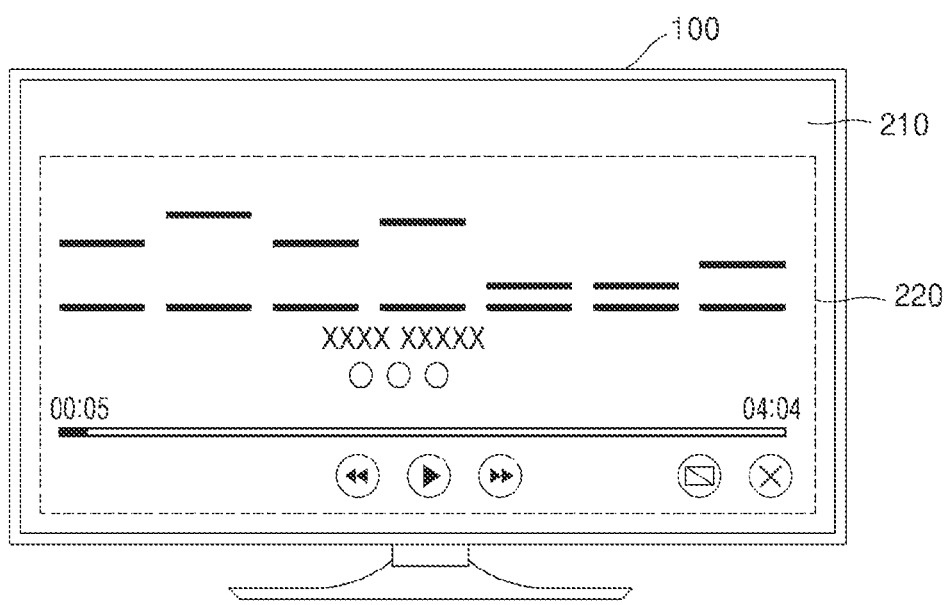
FIG. 2A is a diagram illustrating an example of a screen output by the display device when sound mirroring is performed, according to an embodiment of the disclosure.

Hereinafter, the disclosure will be described in greater detail by explaining various example embodiments of the disclosure with reference to the attached drawings. The disclosure may, however, be embodied in many different forms and should not be understood as being limited to the embodiments of the disclosure set forth herein. In the drawings, parts not related to the disclosure may not be illustrated for clarity of explanation, and like reference numerals denote like elements.

It will be understood that when an element is referred to as being "connected to" another element, it may be "directly connected to" the other element or be "connected to" the other element through an intervening element. It will be further understood that the terms "includes" and/or "including", when used herein, specify the presence of stated elements, but do not preclude the presence or addition of one or more other elements, unless the context clearly indicates otherwise.

Herein, expressions such as "some embodiments of the disclosure" and "an embodiment of the disclosure" do not always designate the same embodiment(s) of the disclosure.

Some embodiments of the disclosure may be described in terms of functional blocks and various processing steps. Some or all of the functional blocks may be implemented by any number of hardware and/or software elements configured to perform certain functions. For example, the functional blocks of the disclosure may be implemented by one or more processors or microprocessors, or circuit elements for certain functions. As another example, the functional blocks of the disclosure may be implemented using any programming or scripting language. The functional blocks may be implemented using various algorithms executed by the one or more processor. Furthermore, the disclosure might employ known technologies for electronic settings, signal processing, and/or data processing. Terms such as "module", "element", and "unit" may be widely used and are not limited to mechanical and physical elements.

In addition, connection lines or connection members between elements illustrated in the drawings may illustrate functional connections and/or physical or circuit connections. Connections between elements may be represented by replaceable or additional various functional connections, physical connections, or circuit connections in an actual apparatus.

Throughout the disclosure, the expression "at least one of a, b or c" indicates only a, only b, only c, both a and b, both a and c, both b and c, all of a, b, and c, or variations thereof.

Reference will now be made in detail to example embodiments of the disclosure, examples of which are illustrated in the accompanying drawings.

A display device according to an embodiment of the disclosure may include all external devices for visually outputting certain contents. For example, the display device according to an embodiment of the disclosure may include, without limitation, all external devices capable of selectively displaying at least one content, and may be provided in various forms, e.g., a television (TV), a digital broadcast receiver, a tablet personal computer (PC), a mobile phone, a computer, a laptop computer, etc., but is not limited thereto. The display device may not only be stationary but may also be portable or carriable by a user.

In various example embodiments of the disclosure, the display device may transmit and receive data to and from an external device through a wireless network, and receive audio signals transmitted from the external device, and output the received audio signals. In various example embodiments of the disclosure, the wireless network for connecting the display device to the external device may be a Bluetooth network conforming to the Bluetooth communication standards. Hereinafter, a case where the wireless communication is Bluetooth communication will be described as an example.

FIG. 1 is a diagram illustrating example sound mirroring between a display device 100 and an external device 150, according to an embodiment of the disclosure.

Referring to FIG. 1, the display device 100 may be connected to the external device 150 through a Bluetooth network 130, and transmit and receive certain data through the connected Bluetooth network 130. In the following description, for convenience of explanation, 'communication connection through a Bluetooth network' may be abbreviated as, or used interchangeably with, 'Bluetooth connection'.

FIG. 1 illustrates an example in which the external device 150 is a mobile phone. However, it will be understood that the disclosure is not limited thereto.

Referring to FIG. 1, the display device 100 may be interconnected with the external device 150 through a wireless network to provide a mirroring service. Mirroring may refer, for example, to a technology for transmitting data being reproduced on one of a plurality of electronic devices, to another device (e.g., a sink device) in such a manner that the received data is reproduced by the sink device, and the mirroring service may refer, for example, to a service provided based on the mirroring technology.

The device providing the data may, for example, be referred to as a source device or a master device, and the device receiving the data may, for example, be referred to as a sink device or a client device. In the following description, the device providing the data may be referred to as a source device, and the device receiving the data may be referred to as a sink device.

For example, the display device 100 may be interconnected with the external device 150 through a wireless network to provide a sound mirroring service for transmitting and outputting a sound signal.

To provide the mirroring service, a device for providing data, e.g., a source device, may transmit certain data to a device for receiving the data, e.g., a sink device. Based on the data transmission, the sound mirroring service may enable a plurality of electronic devices connected through a wireless network, to share and reproduce the same music.

Referring to FIG. 1, the external device 150 may reproduce music and transmit audio data corresponding to the reproduced music, through the Bluetooth network 130 to the display device 100 using, for example, and without limitation, a processor, program, application, or the like, for providing a sound mirroring service. In this example, the external device 150 may output a user interface (UI) screen 151 including a music play menu 160. The display device 100 may output a UI screen 110 corresponding to reproduction of the music mirrored from the external device 150.

In this example, the display device 100 may operate as a Bluetooth (BT) speaker connected to the external device 150. FIG. 1 illustrates an example in which the external device 150 is a mobile phone or a smartphone of a user. However, it will be understood that the disclosure is not limited thereto.

The sound mirroring service may, for example, be performed by finding and connecting electronic devices according to the Bluetooth advanced audio distribution profile (A2DP) included in the Bluetooth communication standard between electronic devices.

In an example embodiment of the disclosure, the display device 100 may operate as at least one of a sink device or a source device. For example, in an embodiment of the disclosure, the display device 100 may support both of a sink mode in which the display device 100 operates as a sink device and a source mode in which the display device 100 operates as a source device. For example, when the display device 100 is connected to an external speaker (not shown), the display device 100 may operate in an A2DP source mode. As another example, when the display device 100 is connected to a mobile phone (e.g., 150), the display device 100 may operate in an A2DP sink mode. In an embodiment of the disclosure, the display device 100 may operate in one of the A2DP sink mode and the A2DP source mode, which is appropriate for the type of an external device connected thereto.

For example, the mobile phone serving as the external device 150 may find and be connected to the display device 100 according to the Bluetooth A2DP source mode, and use the display device 100 like a BT speaker. In this example, the display device 100 operates as an A2DP sink device, and the external device 150 operates as an A2DP source device.

The following description assumes an example in which the display device 100 according to an embodiment of the disclosure operates as a sink device for receiving audio data and the external device 150 operates as a source device for transmitting the data. However, it will be understood that this is for convenience of description, and that the disclosure is not limited thereto.

Figure 2B:
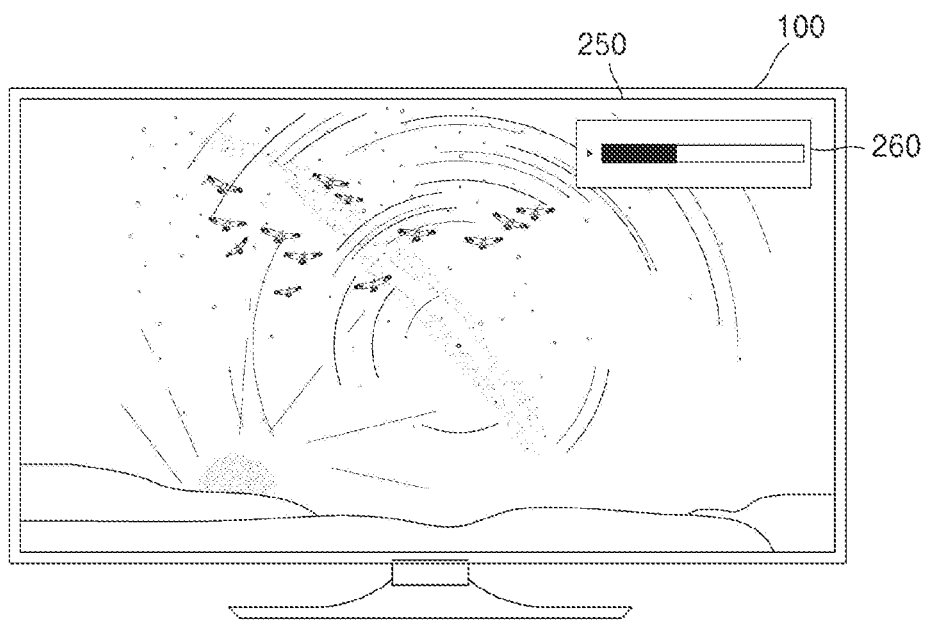
FIG. 2B is a diagram illustrating another example of a screen output by the display device when sound mirroring is performed, according to an embodiment of the disclosure.

FIG. 2A is a diagram illustrating an example of a screen output by the display device when sound mirroring is performed, according to an embodiment of the disclosure, and FIG. 2B is a diagram illustrating another example of a screen output by the display device when sound mirroring is performed, according to an embodiment of the disclosure.

While sound mirroring is being performed, the display device 100 may output a UI screen corresponding to reproduction of mirrored music.

Referring to FIG. 2A, a menu 220 indicating reproduction of the mirrored music may be displayed on a whole screen 210. For example, a UI screen indicating reproduction of the mirrored music may be generated as a background screen.

Referring to FIG. 2B, a menu 260 indicating reproduction of the mirrored music may be displayed, for example, on a part of a top area of a screen 250. For example, the menu 260 indicating reproduction of the mirrored music may be generated as a mini player UI located on a partial area of the whole screen 250.

As described above, while sound mirroring is being performed, the display device 100 may output, on a display thereof, a UI screen corresponding to reproduction of music received from the external device 150.

Figure 3:
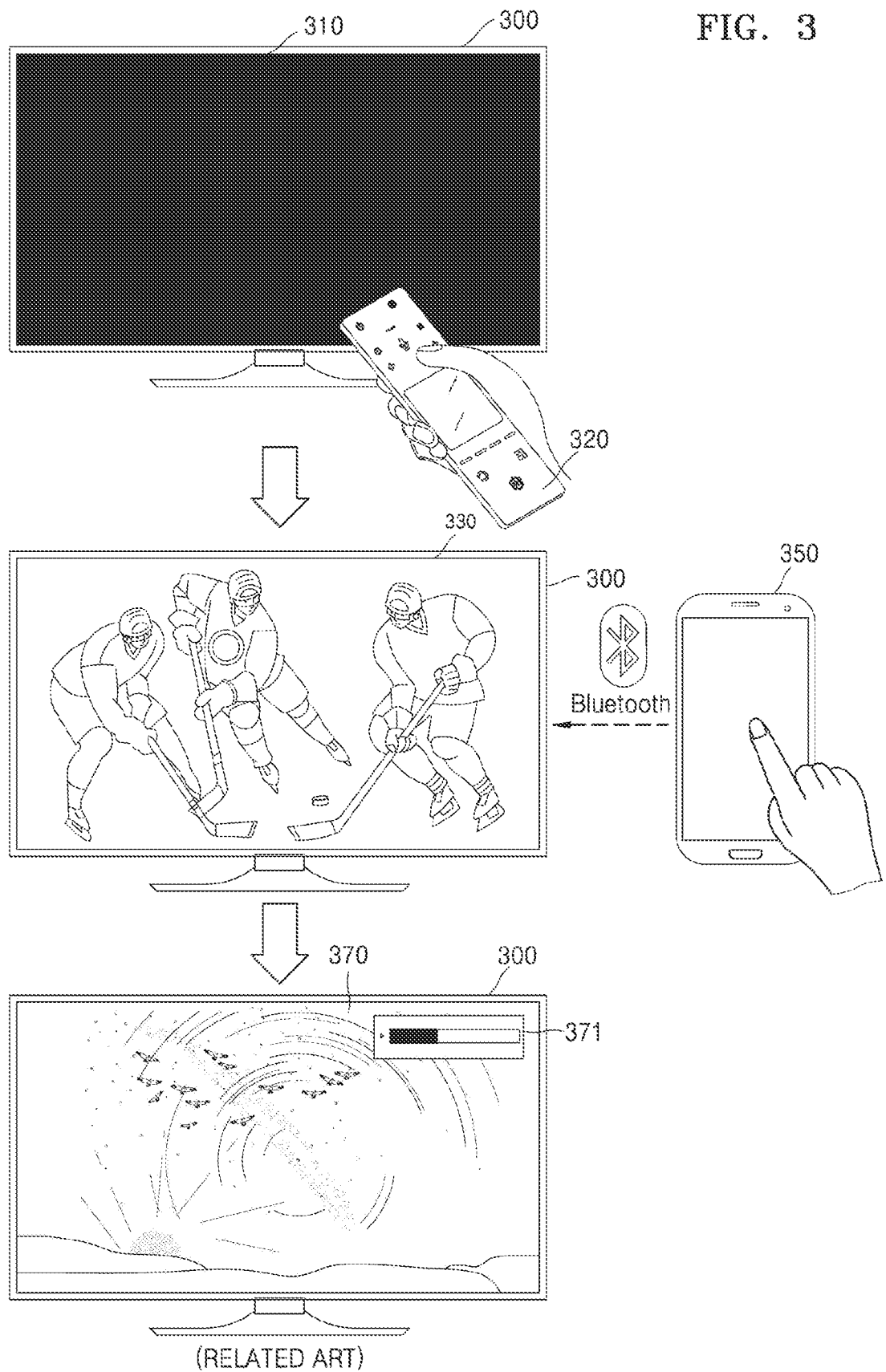
FIG. 3 is a diagram illustrating example operations required in the related art to perform sound mirroring when a general display device is in a power-off state.

FIG. 3 is a diagram illustrating example operations required in the related art to perform sound mirroring when a general display device is in a power-off state. For example, the general display device may be a television (TV), but is not limited thereto. FIG. 3 illustrates an example in which the display device is a TV 300. A mobile phone 350 is illustrated as an example of an external device connectable to the display device (e.g., the TV 300) through a wireless network such as a Bluetooth network.

Assuming that a user desires to use a sound mirroring service from the mobile phone 350 to the TV 300 through Bluetooth connection, the Bluetooth connection to the mobile phone 350 is typically enabled only when the general TV 300 is powered on. For example, when the TV 300 is powered off, a Bluetooth connection operation to the TV 300 may not be performed by manipulating the mobile phone 350. When the TV 300 is in the power-off state, the TV 300 is in a 'screen-off' state in which no screen is output. For example, when the TV 300 is in the power-off state, a display may display a black screen.

When the general TV 300 is in the power-off state, although a Bluetooth signal for requesting Bluetooth connection for audio transmission (e.g., sound mirroring) is received from an external device such as the mobile phone 350, no operation may be performed in response to the Bluetooth signal. For example, when the TV 300 is in the power-off state, although the mobile phone 350 requests Bluetooth connection to the TV 300, no operation for Bluetooth connection is performed in response to the request in the related art.

Referring to FIG. 3, in the related art, when the user desires to use a sound mirroring service using the general TV 300 which is in a power-off state, the user needs to preliminarily manipulate the TV 300 to be powered on. For example, the user needs to power on the TV 300 through a remote controller 320, and then perform Bluetooth connection from the mobile phone 350 to the TV 300 which is in a power-on state.

Specifically, when the TV 300 is powered on, the TV 300 is in a 'screen-on' state in which a certain screen 330 is output on a display. Therefore, the user may perform Bluetooth connection through the mobile phone 350 after the TV 300 is powered on. For example, using a Bluetooth connection function of the mobile phone 350, the user may select the TV 300 as a Bluetooth-connectable device and perform Bluetooth connection between the selected TV 300 and the mobile phone 350.

Subsequently, when the Bluetooth connection between the TV 300 and the mobile phone 350 is completed, a sound mirroring service between the TV 300 and the mobile phone 350 may be performed under the control of the mobile phone 350. Specifically, the sound mirroring service may be performed using the mobile phone 350 as a source device and using the TV 300 as a sink device.

As such, the TV 300 may display a screen 370 including a menu screen 371 corresponding to sound mirroring. The screen 370 may correspond to the screen 250 illustrated in FIG. 2B.

As described above in relation to the conventional operation illustrated in FIG. 3, when the TV 300 is in the power-off state, Bluetooth connection between the mobile phone 350 and the TV 300 may not be directly performed. Therefore, when the user of the mobile phone 350 desires to use a sound mirroring service through the TV 300, the user unavoidably experiences inconvenience of preliminarily and additionally manipulating the TV 300 to be powered on. In addition, the user needs to wait until the TV 300 is powered on to a screen-on state, to perform the sound mirroring service.

Embodiments of the disclosure disclose a display device capable of increasing user satisfaction by more rapidly and conveniently performing Bluetooth connection for a sound mirroring service, and a method of controlling the same.

A display device and a method of controlling the same, according to embodiments of the disclosure, will now be described in greater detail below with reference to FIGS. 4 to 13.

Figure 4:
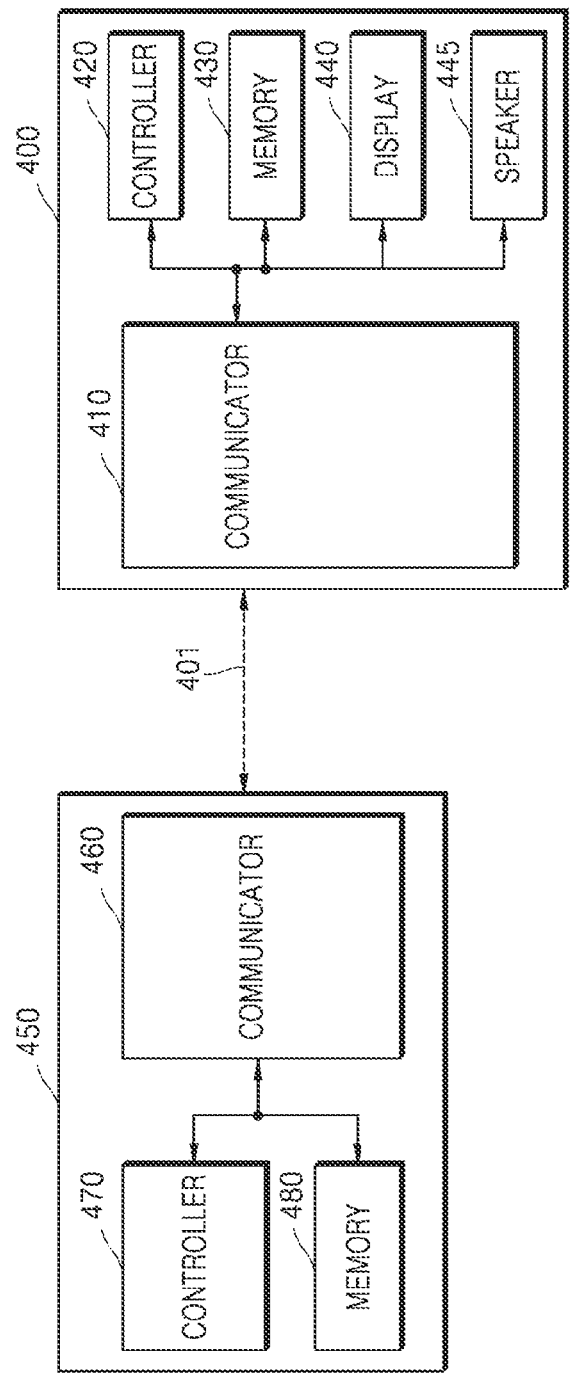
FIG. 4 is a block diagram illustrating an example display device and external device according to an embodiment of the disclosure.

FIG. 4 is a block diagram illustrating an example display device 400 and external device 450 according to an embodiment of the disclosure.

The display device 400 may, for example, be a device for visually outputting, for example, contents, advertisement and guide information, or UI screens to a user, and may be provided in various forms, e.g., a TV, a digital broadcast receiver, etc., but is not limited thereto. The display device 400 may, for example, and without limitation, be embedded in an external device such as a refrigerator (e.g., a display embedded on a front surface of a refrigerator). The display device 400 may, for example, and without limitation, be located at a certain space as a stationary or mobile device.

In an embodiment of the disclosure, the display device 400 may transmit and receive certain data to and from, be paired with, remotely control, or be remotely controlled by at least one adjacent external device 450 through a wireless communication network 401. Hereinafter, a case where the wireless communication is Bluetooth communication will be described as an example. Accordingly, the wireless communication network 401 may be a Bluetooth network.

The external device 450 may be connectable to the display device 400 through the wireless communication network 401 may be a mobile or non-mobile computing device such as, for example, and without limitation, a wearable device, a smartphone, a personal computer (PC), a tablet PC, a personal digital assistant (PDA), a laptop computer, a media player, a microserver, a global positioning system (GPS) device, an electronic book (ebook) reader, a digital broadcast receiver, a navigation system, a kiosk, an MP3 player, an electronic controller of a digital camera or a vehicle, a central information display (CID), or the like, but is not limited thereto. For example, the external device 450 according to an embodiment of the disclosure may include all types of electronic devices carriable by the user, and electronic devices not carriable by the user.

In an embodiment of the disclosure, the display device 400 may perform wireless connection (e.g., Bluetooth connection) to the external device 450 through a wireless network (e.g., Bluetooth network), and receive, from the wireless-connected external device 450, audio data for sound mirroring.

In the following description, the display device 400 according to an embodiment of the disclosure is assumed as a TV, and the external device 450 is assumed as a smartphone capable of performing a sound mirroring service for ease of description. However, it will be understood that the disclosure is not limited thereto.

Referring to FIG. 4, the external device 450 may include a communicator (e.g., including communication circuitry) 460, a controller (e.g., including processing/controlling circuitry) 470, and a memory 480.

The communicator 460 may include various communication circuitry and transmit and/or receive data to and/or from the display device 400 under the control of the controller 470. The communicator 460 may communicate with the display device 400 in a wireless manner through a wireless network formed according to the wireless communication standard. For example, the communicator 460 may perform Bluetooth communication. The communicator 460 may correspond to a communicator 410 of the display device 400 described below, and thus a detailed description thereof will not be repeated here.

The controller 470 may include various processing/controlling circuitry including, for example, and without limitation, at least one processor (not shown) configured to execute one or more instructions, and may control overall operations of the external device 450. For example, the controller 470 may control operations of the external device 450 to perform a sound mirroring service using the external device 450 as a source device. For example, the controller 470 may control a Bluetooth connection request for audio transmission, to be transmitted through the communicator 460 to the display device 400. The controller 470 may correspond to a controller 420 of the display device 400 described below, and thus a detailed description thereof will not be repeated here.

The memory 480 may store one or more instructions. The one or more instructions stored in the memory 480 may be executed by the processor included in the controller 470. The memory 480 may correspond to a memory 430 of the display device 400 described below, and thus a detailed description thereof will not be repeated here. The memory 480 may also store audio data to be mirrored.

The controller 470 of the external device 450 may control a sound mirroring service to be performed. When the sound mirroring service is started under the control of the controller 470, Bluetooth-connectable devices may be found and one of the found devices may be selected as a sink device. The controller 470 may control a Bluetooth connection request to be transmitted to the selected sink device. The sink device selected for the sound mirroring service may, for example, be the display device 400 described below, but the disclosure is not limited thereto.

Referring to FIG. 4, the display device 400 according to an embodiment of the disclosure includes a communicator (e.g., including communication circuitry) 410, a controller (e.g., including processing/controlling circuitry) 420, a memory 430, a display 440, and a speaker 445.

The communicator 410 may include various communication circuitry and transmit and/or receive data to and/or from the external device 450 under the control of the controller 420. For example, the communicator 410 may communicate with the external device 450 in a wireless manner through a wireless network formed according to a wireless communication standard, e.g., the Bluetooth communication standard.

In an embodiment of the disclosure, the communicator 410 may perform Bluetooth communication. For example, the communicator 410 may transmit and/or receive a Bluetooth signal to and/or from the external device 450 through the wireless communication network 401 (e.g., the Bluetooth network 401) formed according to the Bluetooth communication standard. For example, the communicator 410 may include a Bluetooth communicator (not shown) (see, e.g., reference numeral 610 of FIG. 6) configured to transmit and/or receive an audio signal to and/or from the external device 450 according to the Bluetooth A2DP included in the Bluetooth communication standard.

The controller 420 includes various processing/controlling circuitry, such as, for example, and without limitation, at least one processor (not shown) configured to execute one or more instructions. Each of the at least one processor may perform a certain operation by executing at least one of one or more instructions stored in the memory 430.

Each of the at least one processor may perform a certain operation by executing at least one of one or more instructions stored in the controller 420.

The at least one processor included in the controller 420 may control operations performed by the display device 400, and/or control the other elements included in the display device 400, to perform a certain operation. Therefore, although it is described below that the controller 420 controls certain operations to be performed, it will be easily understood that the at least one processor included in the controller 420 may control the certain operations to be performed.

The controller 420 may include an internal memory (not shown) and at least one processor (not shown) configured to execute at least one program stored in the internal memory. For example, the internal memory of the controller 420 may store one or more instructions. The at least one processor included in the controller 420 may perform a certain operation by executing at least one of the one or more instructions stored in the internal memory of the controller 420.

For example, the controller 420 may include random access memory (RAM) (not shown) storing signals and/or data input from outside the display device 400 and/or used as a storage area for various operations performed by the display device 400, read-only memory (ROM) (not shown) storing a plurality of instructions and/or a control program for controlling the display device 400, and at least one processor (not shown). The processor may include a graphic processing unit (GPU) (not shown) for processing graphics corresponding to video data. The processor may be implemented as a system on chip (SOC) in which a core (not shown) is integrated with a GPU (not shown). The processor may include a single core, dual cores, triple cores, quad cores, or cores corresponding to a multiple thereof.

In the following description, for convenience of explanation, an example in which, when the controller 420 performs or controls a certain operation, the processor of the controller 420 performs the certain operation by executing at least one instruction stored in the memory 430 will be described.

The memory 430 may store one or more instructions. The one or more instructions stored in the memory 430 may be executed by the processor included in the controller 420.

The memory 430 may include, for example, and without limitation, at least one of flash memory, a hard disk, a multimedia card micro, card-type memory (e.g., secure digital (SD) or extreme digital (XD) memory), random access memory (RAM), static RAM (SRAM), read-only memory (ROM), electrically erasable programmable ROM (EEPROM), programmable ROM (PROM), magnetic memory, a magnetic disc, an optical disc, or the like.

The display 440 may output an image corresponding to video data, on a display panel included therein, such that the user may visually recognize the video data.

The speaker 445 may output an audio signal to be audibly recognized by the user. In an embodiment of the disclosure, when a sound mirroring service between the display device 400 and the external device 450 is performed, the speaker 445 may output mirrored music to be audibly recognized by the user, under the control of the controller 420.

In an embodiment of the disclosure, when a wireless connection request (e.g., Bluetooth connection request) for audio transmission is received from the external device 450 while the display device 400 is in a power-off state, the communicator 410 transmits, to the external device 450, a response indicating acceptance of the wireless connection request (e.g., Bluetooth connection request), and operates to wake up the controller 420 to a state requiring wireless connection (e.g., Bluetooth connection). Hereinafter, a case where the wireless communication is Bluetooth communication and wireless connection request is Bluetooth connection request will be described as an example.

In an embodiment of the disclosure, an operation mode of the display device 400 may, for example, include a normal mode corresponding to a power-on state, and a sleep mode corresponding to a power-off state.

The normal mode may refer, for example, to an operation mode in which power is supplied to the communicator 410 and one or more other elements of the display device 400. Therefore, the display device 400 may display a certain image in the normal mode. The normal mode may include a background power-on state in which the display 440 is in a screen-off state to display a black screen but the controller 420 is supplied with power to be capable of controlling and/or performing a certain operation. For example, in the background power-on state, although the display 440 is in the screen-off state, the controller 420 is booted and thus may perform a certain operation.

For example, the background power-on state may refer to a state in which the display device 400 is booted in the screen-off state. Therefore, a background power-on operation may be called a background boot operation (see, e.g., reference numeral 803 of FIG. 8). When the controller 420 needs to be booted to perform a certain operation, e.g., a Bluetooth connection operation, while the display device 400 is displaying no meaningful screen on the display 440, the display device 400 may perform a background power-on operation.

The sleep mode may refer, for example, to a mode for saving power of the display device 400 and may refer, for example, to an operation mode in which only the communicator 410 is supplied with power to be capable of transmitting and/or receiving a control signal and/or certain data to and/or from an external device (e.g., a mobile phone (not shown) or a remote controller (not shown)). Power supply to elements other than the communicator 410 may be blocked in the sleep mode. The sleep mode may include, for example, a standby mode, a power saving mode, a low power mode (LPM), or the like, but is not limited thereto.

'Wake-up' may refer, for example, to an operation activated when the display device 400 in the sleep mode enters the normal mode. When the display device 400 is in the sleep mode, power supply to the controller 420 may be blocked to not operate the controller 420, and only the communicator 410 may be supplied with power to be capable of operating. In this example, the communicator 410 may generate a signal for waking up the controller 420, and transmit the signal to the controller 420 based on, for example, a scanned or received Bluetooth signal and/or remote control signal.

In an embodiment of the disclosure, the communicator 410 may transmit a control signal corresponding to a received Bluetooth signal, to the controller 420 while the display device 400 is being powered on.

An operation mode in a case when the display device 400 is in a power-on or background power-on state may be referred to as a host controller interface (HCI) mode.

When the display device 400 is powered off, although the communicator 410 receives a Bluetooth signal, a control signal corresponding the received Bluetooth signal may be transmitted to the controller 420 not immediately but after the controller 420 wakes up. An operation mode in a case when the display device 400 is powered off may be referred to as an LPM mode.

Figure 5:
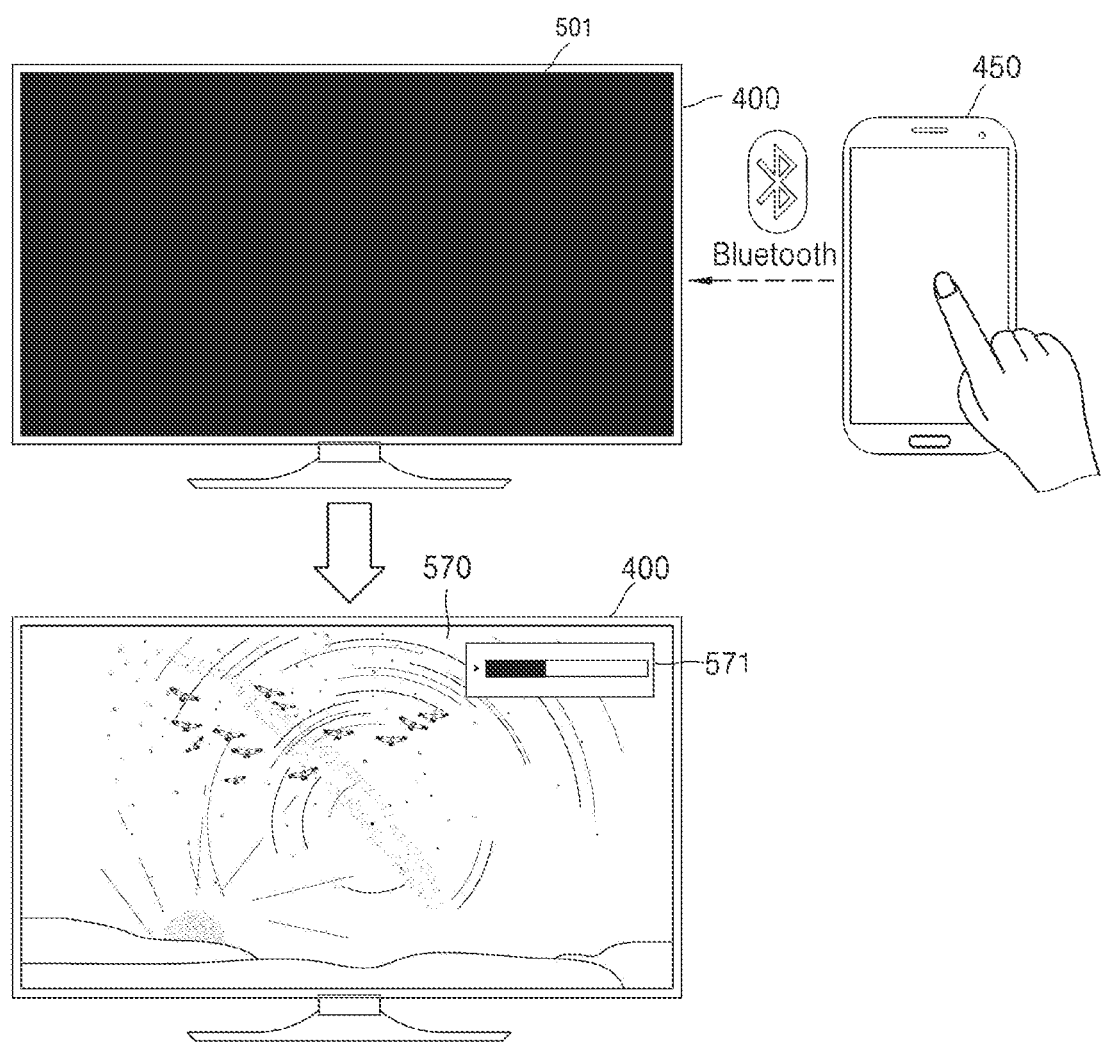
FIG. 5 is a diagram illustrating example operations to perform sound mirroring when the display device according to an embodiment of the disclosure is in a power-off state.

FIG. 5 is a diagram illustrating example operations to perform a sound mirroring service when the display device 400 according to an embodiment of the disclosure is in a power-off state. In FIG. 4 and FIG. 5, like reference numerals denote like elements.

In an embodiment of the disclosure, when a Bluetooth connection request for audio transmission is received from the external device 450 while the display device 400 is in the power-off state, the communicator 410 does not ignore the Bluetooth connection request. For example, the communicator 410 may transmit a response indicating acceptance of the Bluetooth connection request, to the external device 450 in response to the received Bluetooth connection request. The communicator 410 may generate a signal for waking up the controller 420 to subsequently perform Bluetooth connection (e.g., a pulsed signal illustrated in FIG. 9), and transmit the generated signal to the controller 420. The controller 420 may wake up in response to the signal transmitted from the communicator 410, and perform operations for Bluetooth connection.

As such, according to an embodiment of the disclosure, even in a power-off state, the display device 400 may perform a Bluetooth connection operation in response to a Bluetooth connection request for audio transmission of the external device 450, and perform a subsequent operation for audio transmission (e.g., a sound mirroring operation).

Referring to FIG. 5, when the display device 400 is in the power-off state, the display device 400 displays a black screen 501. In this example, the external device 450 such as a mobile phone may access the display device 400 to attempt Bluetooth connection using an application or program for providing a sound mirroring service. The communicator 410 of the display device 400 receives the Bluetooth connection request transmitted from the external device 450, and operates to wake up the controller 420 to a state requiring Bluetooth connection, in response to the Bluetooth connection request.

Referring to FIG. 5, the controller 420 may wake up in response to the operations of the communicator 410, and perform a subsequent operation for Bluetooth connection. For example, when the controller 420 wakes up, the display device 400 may be powered on. The controller 420 may control the display device 400 to perform Bluetooth connection and perform sound mirroring. As such, the display device 400 may display a screen 570 including a menu screen 571 corresponding to sound mirroring.

As described above, even when the display device 400 according to an embodiment of the disclosure is in a power-off state, a user may use a sound mirroring service through the display device 400 by manipulating the external device 450. Therefore, the additional manipulation and delay time described above in relation to FIG. 3 may be prevented and/or reduced and user convenience may be increased.

Figure 6:
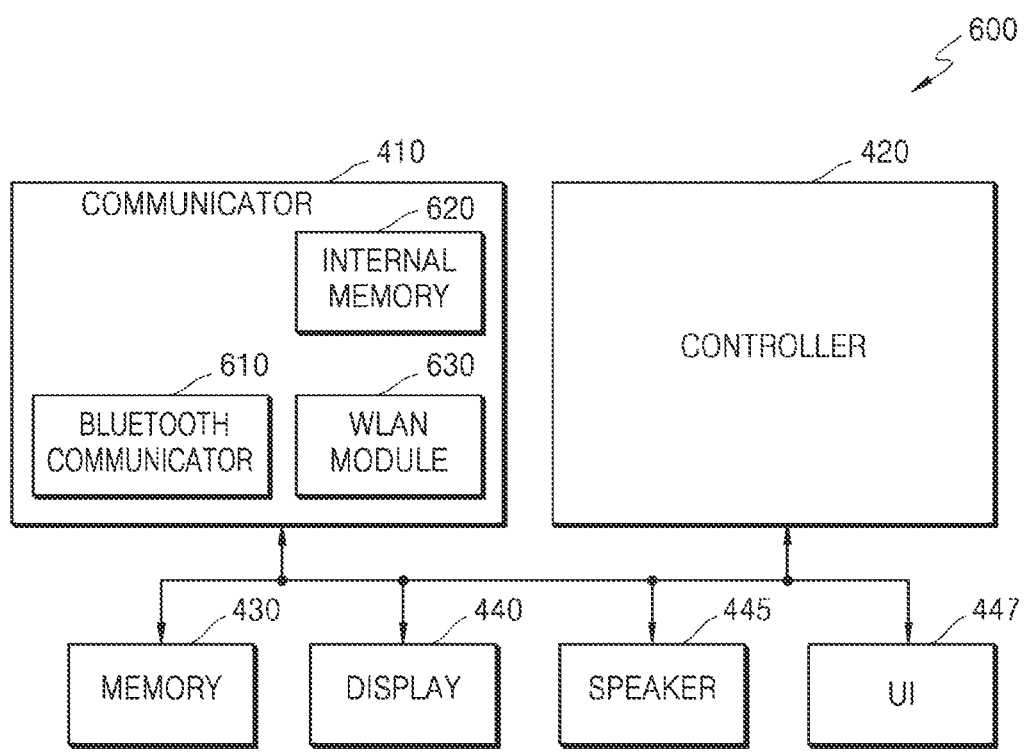
FIG. 6 is a block diagram illustrating an example display device according to an embodiment of the disclosure.

FIG. 6 is a block diagram illustrating an example display device 600 according to an embodiment of the disclosure. In FIG. 4 and FIG. 6, like reference numerals denote like elements. The display device 600 illustrated in FIG. 6 corresponds to the display device 400 illustrated in FIG. 4, and thus the descriptions provided above in relation to FIGS. 1 to 5 may not be repeated to describe the display device 600 illustrated in FIG. 6.

Referring to FIG. 6, the communicator 410 includes various communication circuitry, such as, for example, and without limitation, a Bluetooth communicator 610 including various Bluetooth communication circuitry configured to perform Bluetooth communication. The communicator 410 may further include at least one of a wireless local area network (WLAN) module (e.g., including WLAN circuitry) 630 and/or an internal memory 620. The configuration of the Bluetooth communicator 610 will be described in greater detail below with reference to FIG. 8.

The WLAN module 630 may include various WLAN circuitry and transmit and receive wireless signals through a wireless communication network other than a Bluetooth network. For example, the communicator 410 may include at least one wireless communication module for transmitting and receiving wireless signals, e.g., a short-range wireless communication module (not shown), a mobile communication module (not shown), or a broadcast receiver module (not shown).

The at least one wireless communication module may refer, for example, to a communication module including communication circuitry capable of transmitting and receiving data through a wireless communication network conforming to wireless communication standards such as, for example, and without limitation, WLAN (or Wi-Fi), wireless broadband (Wibro), world interoperability for microwave access (Wimax), code division multiple access (CDMA), wideband CDMA (WCDMA), or the like. The at least one wireless communication module may receive a control signal from a remote controller (not shown in FIG. 6 and corresponding to the remote controller 320 illustrated in FIG. 3) for remotely controlling the display device 600.

The communicator 410 may further include a wired communication module including various wired communication circuitry (not shown).

The communicator 410 may include a memory. The memory included in the communicator 410 is illustrated as 'the internal memory 620'. The internal memory 620 may store data transmitted and/or received by the communicator 410. The internal memory 620 may also store, for example, at least one instruction, at least one program, and/or at least one application for controlling or managing operations performed by the communicator 410 when the display device 600 is in in a power-off state.

Compared to the display device 400 illustrated in FIG. 4, the display device 600 may further include a UI 447.

The UI 447 may include various UI circuitry and receive user input for controlling the display device 600. The UI 447 may include a user input device including, for example, and without limitation, a touch panel for sensing touch input of a user, buttons for receiving push input of the user, a wheel for receiving rolling or scrolling input of the user, a keyboard, a dome switch, or the like, but is not limited thereto.

The UI 447 may include a voice recognizer (not shown) for recognizing voice. For example, the voice recognizer may be a microphone and receive a voice command or a voice request of the user. As such, the controller 420 may control an operation corresponding to the voice command or the voice request, to be performed.

The UI 447 may include a motion sensor (not shown). For example, the motion sensor may sense motion of the display device 600 and receive the sensed motion as user input. The above-described voice recognizer and motion sensor may not be included in the UI 447 and be included in the display device 600 as modules independent of the UI 447.

In an embodiment of the disclosure, when the display device 600 performs sound mirroring, the display 440 may output a UI corresponding to sound mirroring. For example, the display device 600 may display the UI screens illustrated in FIGS. 2A and 2B.

The UI 447 may receive user input for controlling a sound mirroring operation. For example, when the user desires to reduce an output volume for a sound mirroring service after the display device 600 starts the sound mirroring service, the UI 447 may receive a control request of the user. The controller 420 may perform an operation corresponding to the control request received by the UI 447.

Figure 7:
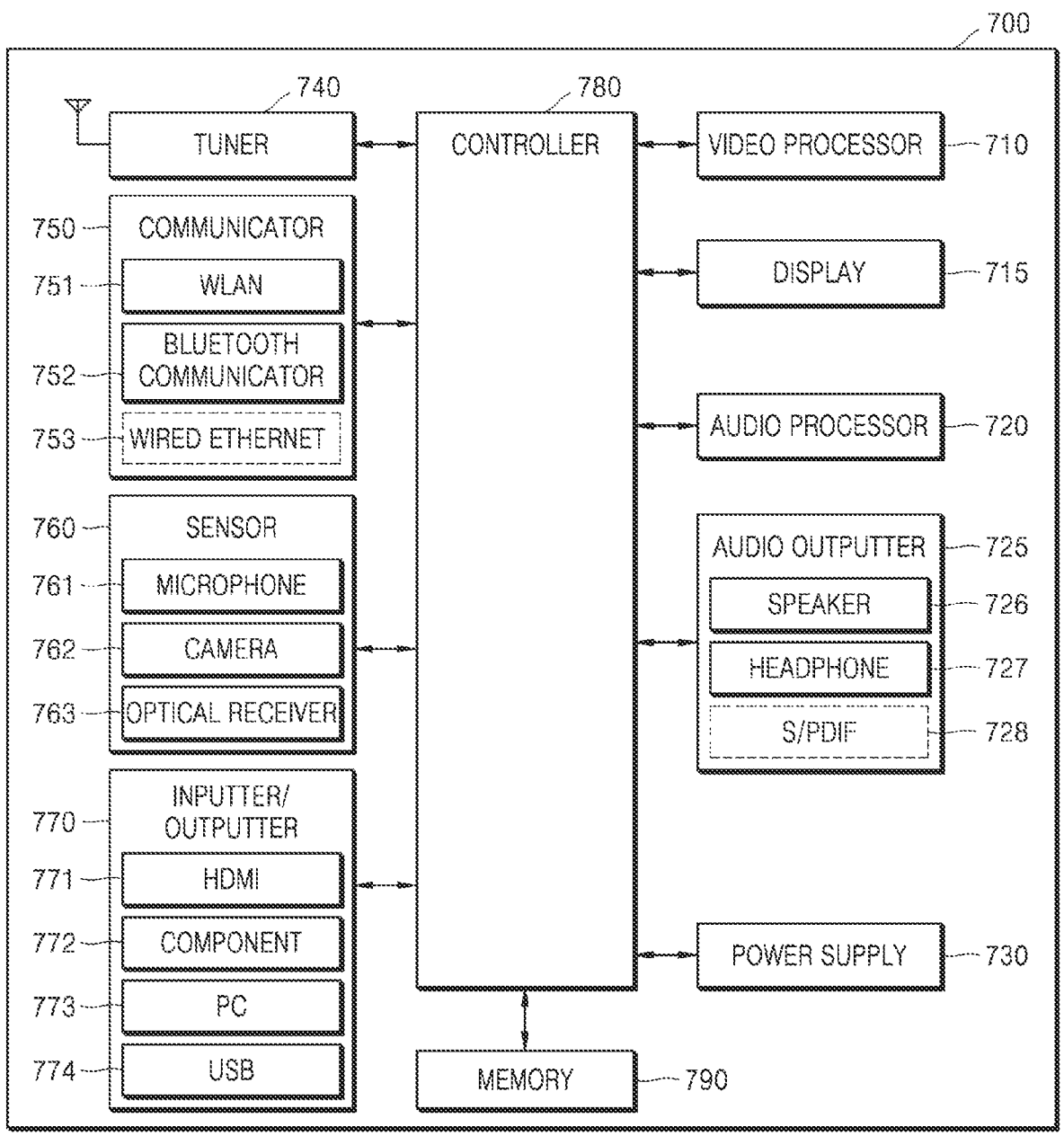
FIG. 7 is a block diagram illustrating an example display device according to another embodiment of the disclosure.

FIG. 7 is a block diagram illustrating an example display device 700 according to another embodiment of the disclosure.

The display device 700 according to another embodiment of the disclosure may correspond to the display device 100, 400, or 600 described above in relation to FIGS. 1 to 6 according to an embodiment of the disclosure. Therefore, the descriptions provided above in relation to FIGS. 1 to 6 may not be repeated here to describe the display device 700. For example, the display device 700 may include a display device capable of performing Bluetooth communication with an external device.

Referring to FIG. 7, the display device 700 includes a video processor (e.g., including video processing circuitry) 710, a display 715, an audio processor (e.g., including audio processing circuitry) 720, an audio outputter (e.g., including audio output circuitry) 725, a power supply 730, a tuner 740, a communicator (e.g., including communication circuitry) 750, a sensor 760, an inputter/outputter (e.g., including input/output circuitry) 770, a controller (e.g., including processing/controlling circuitry) 780, and a memory 790.

The controller 780 may correspond to the controller 420 illustrated in FIGS. 4 and 5. The communicator 750, a Bluetooth communicator 752, a WLAN module 751, the display 715, the audio outputter 725, and the memory 790 of the display device 700 may correspond to the communicator 410, the Bluetooth communicator 610, the WLAN module 630, the display 440, the speaker 445, and the memory 430 illustrated in FIG. 4 and/or FIG. 5, respectively. Therefore, the descriptions provided above in relation to the display device 400 or 600 according to an embodiment of the disclosure may not be repeated here to describe the display device 700 illustrated in FIG. 7.

The video processor 710 may include various video processing circuitry and processes video data received by the display device 700. The video processor 710 may perform various video processing operations such as, for example, and without limitation, video data decoding, scaling, noise filtering, frame rate conversion, resolution conversion, etc.

The controller 780 may include various processing/controlling circuitry and receive a request to record the video data processed by the video processor 710, and control the video data to be encoded and recorded on a memory device (not shown), e.g., RAM (not shown), included in the controller 780 or the memory 790.

The display 715 displays video data included in a broadcast signal received through the tuner 740, on a screen under the control of the controller 780. The display 715 may display content (e.g., a moving image) input through the communicator 750 or the inputter/outputter 770.

The display 715 may output an image stored in the memory 790, under the control of the controller 780. The display 715 may display a voice UI (for example, including a voice instruction guide) for performing a task corresponding to recognized voice, or a motion UI (for example, including a user motion guide for motion recognition) for performing a task corresponding to recognized motion.

The audio processor 720 may include various audio processing circuitry and processes audio data. The audio processor 720 may perform various processing operations such as, for example, and without limitation, audio data decoding or amplification, noise filtering, etc. The audio processor 720 may include a plurality of audio processing modules to process audio data corresponding to a plurality of contents.

The audio outputter 725 may include various audio output circuitry and outputs audio data included in the broadcast signal received through the tuner 740, under the control of the controller 780. The audio outputter 725 may output audio data (e.g., voice or sound) input through the communicator 750 or the inputter/outputter 770. The audio outputter 725 may output audio data stored in the memory 790, under the control of the controller 780. The audio outputter 725 may include, for example, and without limitation, at least one of a speaker 726, a headphone output port 727, a Sony/Philips digital interface (S/PDIF) output port 728, or the like. The audio outputter 725 may include a combination of the speaker 726, the headphone output port 727, and the S/PDIF output port 728.

In an embodiment of the disclosure, the speaker 726 may output a sonic signal. For example, the speaker 726 may output an ultrasonic signal.

The power supply 730 supplies power input from an external power source, to the other elements 710 to 790 in the display device 700 under the control of the controller 780. The power supply 730 may supply power output from one or more batteries (not shown) located in the display device 700, to the other elements 710 to 790.

The tuner 740 may be tuned to and select only a frequency of a channel desired to be received by the display device 700 from among many radio wave components by performing, for example, amplification, mixing, and resonance on a broadcasting signal received in a wired or wireless manner. The broadcast signal includes audio data, video data, and additional information (e.g., an electronic program guide (EPG)).

The tuner 740 may receive the broadcast signal in a frequency band corresponding to a channel number (e.g., cable broadcast channel number 506) based on a user input (for example, a control signal received from an external controller (not shown) such as a remote controller, e.g., a channel number input, a channel up-down input, or a channel input on an EPG screen).

The tuner 740 may receive the broadcast signal from various sources such as terrestrial, cable, satellite, and Internet broadcasters. The tuner 740 may receive the broadcast signal from sources such as analog and digital broadcasters. The broadcast signal received through the tuner 740 may be decoded (e.g., audio-decoded, video-decoded, or additional-information-decoded) into the audio data, video data, and/or additional information. The decoded audio data, video data, and/or additional information may be stored in the memory 790 under the control of the controller 780.

The display device 700 may include one or more tuners 740. When a plurality of tuners 740 are included according to an embodiment of the disclosure, a plurality of broadcast signals may be output on a plurality of windows included in a multi-window screen provided on the display 715.

The tuner 740 may be integrated with the display device 700 in the form of an all-in-one device, or be implemented as a separate device having a tuner electrically connected to the display device 700 (e.g., a set-top box (not shown) or a tuner (not shown) connected to the inputter/outputter 770).

The communicator 750 may include various communication circuitry and connect the display device 700 to an external device (e.g., an audio device) under the control of the controller 780. The controller 780 may transmit or receive content to or from the connected external device, download an application from the external device, or perform web browsing through the communicator 750. For example, the communicator 750 may access a network to receive content from an external device (not shown).

As described above, the communicator 750 may include various modules containing various communication circuitry, such as, for example, and without limitation, at least one of a short-range wireless communication module (not shown), a wired communication module (not shown), a mobile communication module (not shown), or the like.

FIG. 7 illustrates an example in which the communicator 750 includes at least one of the WLAN module 751, the Bluetooth communicator 752, and/or a wired Ethernet module 753.

The communicator 750 may include a combination of two or more of the WLAN module 751, the Bluetooth communicator 752, and the wired Ethernet module 753. The communicator 750 may receive a control signal of the external controller (e.g., a remote controller) under the control of the controller 780. The control signal may be implemented in a Bluetooth type, a radio frequency (RF) signal type, or a Wi-Fi type.

The communicator 750 may further include a non-Bluetooth short-range wireless communication module (e.g., a near field communication (NFC) module (not shown)) and a separate bluetooth low energy (BLE) module (not shown).

The sensor 760 may sense a voice of a user, an image of the user, interaction of the user, etc.

A microphone 761 may receive a voice uttered by the user. The microphone 761 may convert the received voice into an electrical signal and output the electrical signal to the controller 780. The voice of the user may include, for example, voice corresponding to a menu or a function of the display device 700. For example, a recognition range of the microphone 761 is recommended within a distance of 4 m from the microphone 761 to the location of the user, and may vary depending on a voice volume of the user and an ambient environment (e.g., a speaker volume and ambient noise).

The microphone 761 may be integrated with or separate from the display device 700. The separate microphone 761 may be electrically connected to the display device 700 through the communicator 750 or the inputter/outputter 770.

It will be easily understood by one of ordinary skill in the art that the microphone 761 may be excluded depending on the performance and structure of the display device 700.

A camera 762 may receive an image (e.g., consecutive frames) corresponding to motion (including a gesture) of the user in a recognition range of the camera 762. For example, the recognition range of the camera 762 may be within a distance of 0.1 m to 5 m from the camera 762 to the user. The motion of the user may include, for example, a gesture or motion of a body part of the user, e.g., the face, a hand, a fist, or a finger. The camera 762 may convert the received image into an electrical signal and output the electrical signal to the controller 780 under the control of the controller 780.

The controller 780 may select a menu to be displayed on the display device 700 or perform a control operation based on the received motion recognition result. For example, the controller 780 may switch channels, control a volume, or move an indicator.

The camera 762 may include a lens (not shown) and an image sensor (not shown). The camera 762 may support optical zoom or digital zoom using a plurality of lenses and an image processor. The recognition range of the camera 762 may be variously set based on an angle of the camera 762 and an ambient environment condition. When the camera 762 includes a plurality of cameras, a 3-dimensional still image or a 3-dimensional moving image may be received using the plurality of cameras.

The camera 762 may be integrated with or separate from the display device 700. A device (not shown) including the separate camera 762 may be electrically connected to the display device 700 through the communicator 750 or the inputter/outputter 770.

It will be easily understood by one of ordinary skill in the art that the camera 762 may be excluded depending on the performance and structure of the display device 700.

An optical receiver 763 may receive an optical signal (including a control signal) from the external controller through, for example, an optical window (not shown) of a bezel of the display 715. The optical receiver 763 may receive, from the external controller, an optical signal corresponding to user input (e.g., touch, push, a touch gesture, voice, or motion). A control signal may be extracted from the received optical signal under the control of the controller 780.

For example, the optical receiver 763 may receive a signal corresponding to a pointing location of the external controller, and transmit the signal to the controller 780. For example, when a UI screen for receiving data or a command from the user is output on the display 715 and the user desires to input data or a command to the display device 700 through the external controller, and when the user moves the external controller while touching a finger on a touchpad (not shown) provided on the external controller, the optical receiver 763 may receive a signal corresponding to the motion of the external controller, and transmit the signal to the controller 780. The optical receiver 763 may receive a signal indicating that a specific button provided on the external controller is pressed, and transmit the signal to the controller 780. For example, when the user presses, with a finger, a button-type touchpad (not shown) provided on the external controller, the optical receiver 763 may receive a signal indicating that the button-type touchpad is pressed, and transmit the signal to the controller 780. For example, the signal indicating that the button-type touchpad is pressed may be used as a signal for selecting one of items.

The inputter/outputter 770 may include various input/output circuitry and receive, for example, video data (e.g., a moving image), audio data (e.g., voice or music), and additional information (e.g., an EPG) from outside the display device 700 under the control of the controller 780. The inputter/outputter 770 may include, for example, and without limitation, at least one of a high-definition multimedia interface (HDMI) port 771, a component jack 772, a PC port 773, a universal serial bus (USB) port 774, or the like. The inputter/outputter 770 may include a combination of the HDMI port 771, the component jack 772, the PC port 773, and the USB port 774.

It will be easily understood by one of ordinary skill in the art that the configuration and operation of the inputter/outputter 770 may be implemented in various ways according to an embodiment of the disclosure.

The controller 780 may include various processing/controlling circuitry and controls overall operations of the display device 700 and signal flows between the elements of the display device 700, and processes data. When user input is received or a preset condition is satisfied, the controller 780 may execute an operating system (OS) and various applications stored in the memory 790.

The controller 780 may include a RAM (not shown) storing signals or data input from outside the display device 700 or used as a storage area for various operations performed by the display device 700, a ROM (not shown) storing a control program for controlling the display device 700, and a processor including various processing circuitry (not shown).

The processor may include a GPU (not shown) for processing graphics corresponding to video data. The processor may be implemented as a SOC in which a core (not shown) is integrated with a GPU (not shown). The processor may include a single core, dual cores, triple cores, quad cores, or cores corresponding to a multiple thereof.

The processor may include a plurality of processors. For example, the processor may include a main processor (not shown) and a sub-processor operating in a sleep mode.

The GPU may generate a screen including various objects such as icons, images, and text using a calculator (not shown) and a renderer (not shown). The calculator may calculate attribute values such as a coordinate, a shape, a size, and a color of each object to be displayed, based on a screen layout using user interaction sensed by the sensor 760. The renderer may generate a screen of various layouts including objects, based on the attribute values calculated by the calculator. The screen generated by the renderer is displayed in a display area of the display 715.

A Bluetooth connection operation and a subsequent sound mirroring operation of the display device 100, 400, 600, or 700, which are performed in an or another embodiment of the disclosure, will now be described in greater detail below with reference to FIGS. 8 to 11.

Figure 8:
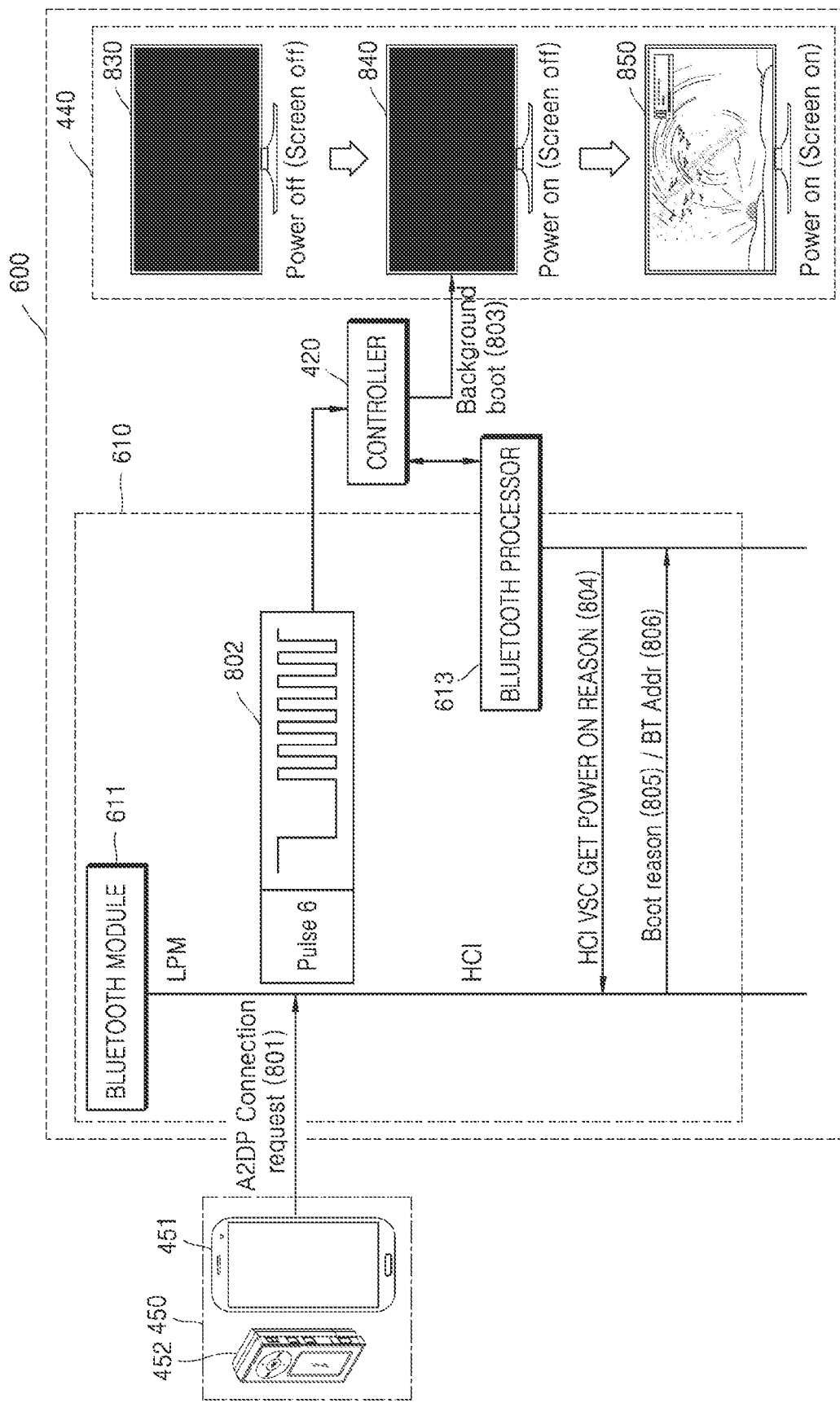
FIG. 8 is a diagram illustrating an example Bluetooth connection operation according to an embodiment of the disclosure.

FIG. 8 is a diagram illustrating an example Bluetooth connection operation performed according an embodiment of the disclosure. In FIG. 4 or 6 and FIG. 8, like reference numerals denote like elements.

Referring to FIG. 8, the external device 450 is an electronic device other than the display device 600, and may, for example, and without limitation, be a mobile phone 451 or a media player 452 capable of transmitting and receiving audio signals by performing Bluetooth communication with the display device 600. In FIG. 8, for ease of description, the mobile phone 451 will be described as an example of the external device 450, but the disclosure is not limited thereto. An example in which communication search, communication connection, and audio transmission between the display device 600 and the mobile phone 451 are performed according to the Bluetooth A2DP included in the Bluetooth communication standard will now be described. For convenience of explanation, in the following description, 'Bluetooth A2DP' is abbreviated to 'A2DP'.

In FIG. 8, an example in which the above-described communicator 410 equally corresponds to the Bluetooth communicator 610 will be described. The Bluetooth communicator 610 may generate and transmit or receive a Bluetooth signal according to the Bluetooth communication standards.

Referring to FIG. 8, the Bluetooth communicator 610 may include a Bluetooth module 611 and a Bluetooth processor 613.

The Bluetooth module 611 transmits or receives the Bluetooth signal. For example, even after the display device 600 enters a power-off state, the Bluetooth module 611 may be supplied with power to scan or receive the Bluetooth signal. The Bluetooth module 611 may store first information corresponding to Bluetooth connection information of external devices having a history of performing Bluetooth connection to the display device 600. For example, the Bluetooth module 611 may store the Bluetooth connection information (e.g., the first information) of the external devices having a history of performing sound mirroring with the display device 600.

The Bluetooth processor 613 may operate when the display device 600 is powered on, and store the Bluetooth connection information (e.g.., the above-described 'first information') of the external devices having a history of performing Bluetooth connection to the display device 600. For example, the Bluetooth processor 613 may store the Bluetooth connection information (i.e., the above-described 'first information') of the external devices having a history of performing Bluetooth connection for audio transmission (e.g., sound mirroring) to the display device 600.

Herein, 'a history of performing Bluetooth connection (for audio transmission) between the display device 600 and the external device 450' may refer, for example, to information indicating whether Bluetooth connection has been completed between the display device 600 and the external device 450 at at least one timing before a current timing. When a legal authentication procedure for Bluetooth connection has been performed and Bluetooth connection has been legally completed between the display device 600 and the external device 450, it may be determined that a history of completing Bluetooth connection between the display device 600 and the external device 450 is present.

In an embodiment of the disclosure, the history may refer, for example, to a Bluetooth connection that has been legally completed between the display device 600 and the external device 450. Therefore, the history may not include a case in which Bluetooth connection has been completed in an illegal manner (e.g., hacking). The history may refer, for example, to a history of being connected to the display device 600 by a user, and is not limited to a history of Bluetooth connection for specific data transmission.

However, based on separate settings of the user or the display device 600, the above-described history may be limited to a history of Bluetooth connection for audio transmission. Based on default settings of the display device 600, the above-described history may be limited to a history of Bluetooth connection for audio transmission.

When Bluetooth connection is legally completed between the display device 600 and the external device 450, the controller 420 of the display device 600 may control the first information corresponding to connection information of external devices which have completed Bluetooth connection, to be stored in the Bluetooth communicator 610. The connection information may include information capable of identifying the external devices legally authenticated and connected through a Bluetooth network. For example, the connection information may include Bluetooth media access control (BT MAC) addresses of the external devices. In addition to the BT MAC addresses, any other information capable of identifying the external devices legally connected to the display device 600 through a Bluetooth network may be included in the first information corresponding to the connection information.

For example, when the legally completed Bluetooth connection is disconnected, the controller 420 may control corresponding connection information to be stored in the Bluetooth communicator 610.

For example, the controller 420 may control the connection information corresponding to the legally completed Bluetooth connection, to be stored in each of the Bluetooth module 611 and the Bluetooth processor 613 of the Bluetooth communicator 610. The above-described first information may be updated and re-stored whenever Bluetooth connection between the display device 600 and the external device 450 is completed or disconnected. The first information may be stored when Bluetooth connection between the display device 600 and the external device 450 is completed or disconnected during a certain period before the current timing. For example, the controller 420 may control the Bluetooth connection information between the display device 600 and the external device 450 to be automatically deleted from each of the Bluetooth module 611 and the Bluetooth processor 613 after a certain period (e.g., a month, three months, or six months).

Alternatively, the controller 420 may control the Bluetooth module 611 and the Bluetooth processor 613 to delete the oldest connection information when an internal data storage space of each of the Bluetooth module 611 and the Bluetooth processor 613 is full.

Referring to FIG. 8, the mobile phone 451 may transmit, to the display device 600, a Bluetooth (A2DP) connection request 801 for audio transmission. For convenience of explanation, in the following description, the bluetooth connection request 801 is an A2DP connection request 801.

When the A2DP connection request 801 is received from the mobile phone 451, the Bluetooth communicator 610 may determine whether a history of performing wireless connection (e.g., Bluetooth connection) between the display device 600 and an external device such as the mobile phone 451 is present. For example, the Bluetooth communicator 610 may determine whether a history of performing wireless connection (e.g., Bluetooth connection) for audio transmission is present. For example, the Bluetooth communicator 610 may determine whether a history of performing wireless connection (e.g., Bluetooth connection) for sound mirroring is present.

An example in which the communicator 410, for example, the Bluetooth communicator 610 according to an embodiment of the disclosure transmits the above-described response based on whether a history of performing wireless connection for audio transmission is present will now be described in greater detail below.

When a history of performing Bluetooth connection between the display device 600 and an external device such as the mobile phone 451 is present, the Bluetooth communicator 610 may transmit, to the mobile phone 451, a response indicating acceptance of the A2DP connection request 801.

For example, whether the above-described history is present may be determined based on history information stored in the Bluetooth communicator 610. The history information may be the above-described connection information.

For example, when the mobile phone 451 has been legally Bluetooth-connected to the display device 600 before the current timing, the Bluetooth communicator 610 stores the connection information of the mobile phone 451, in each of the Bluetooth module 611 and the Bluetooth processor 613. When the Bluetooth communicator 610 or, specifically, the Bluetooth module 611 receives the A2DP connection request 801 at the current timing at which the display device 600 is in a power-off state, the Bluetooth module 611 may determine whether the history information stored therein includes the connection information of the mobile phone 451. For example, the Bluetooth module 611 may determine whether information the same as the connection information (e.g., a BT MAC address) of the mobile phone 451 having transmitted the A2DP connection request 801 is stored therein, and transmit a response indicating acceptance of the A2DP connection request 801, to the mobile phone 451 upon determining that the same information is present.

It is assumed that the display device 600 is in a power-off state and the display 440 is in a screen-off state 830 at the current timing. When the A2DP connection request 801 is received when the display device 600 is in the power-off state, the Bluetooth communicator 610 may operate in such a manner that the display device 600 performs a background power-on operation. The Bluetooth communicator 610 may transmit, to the controller 420, a reason corresponding to the background power-on operation. For the background power-on operation of the display device 600, the Bluetooth module 611 may transmit, to the controller 420, a control signal for waking up the controller 420.

For example, the Bluetooth communicator 610, for example, the Bluetooth module 611 determines, in response to the A2DP connection request 801, whether the above-described history of performing Bluetooth connection between the display device 600 and an external device such as the mobile phone 451 is present. Based on the determination result, the Bluetooth communicator 610 may operate in such a manner that the display device 600 performs the background power-on operation. For example, the Bluetooth communicator 610 determines, in response to the A2DP connection request 801, whether the connection information of the mobile phone 451 is stored therein.

The Bluetooth module 611 may determine, in response to the A2DP connection request 801, whether the history of performing Bluetooth connection for audio transmission is present. Based on whether the history of performing Bluetooth connection for audio transmission is present, the Bluetooth module 611 may operate in such a manner that the display device 600 performs the background power-on operation.

For example, when the connection information of the mobile phone 451 is stored, the Bluetooth module 611 may transmit the control signal for waking up the controller 420, to the controller 420 for the background power-on operation of the display device 600. After the controller 420 wakes up, the controller 420 may control the display device 600 to perform the background power-on operation (or a background boot operation 803). After the background power-on operation, the display 440 may be maintained in a screen-off state 840.

The control signal for waking up the controller 420 may be generated as a pulsed signal 802. The pulsed signal 802 will now be described with reference to FIG. 9.

Figure 9:
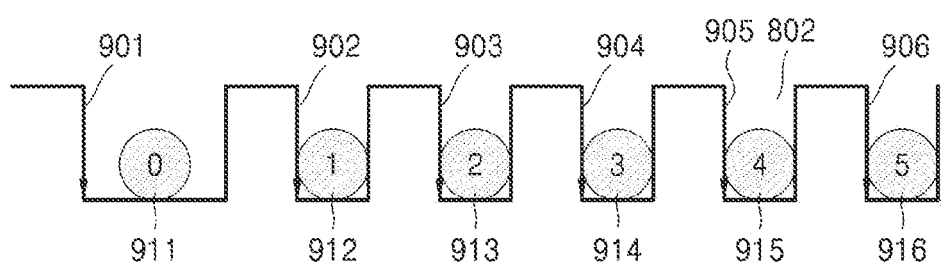
FIG. 9 is a diagram illustrating an example of a pulsed signal internally generated and transmitted by the display device, according to an embodiment of the disclosure.

FIG. 9 is a diagram illustrating an example of a pulsed signal 802 internally generated and transmitted by the display device 600, according to an embodiment of the disclosure.

Referring to FIG. 9, the pulsed signal 802 generated and transmitted to the controller 420 by the Bluetooth module 611 may refer, for example, to different information depending on at least one of the number of rising edges or the number of falling edges. For example, the pulsed signal 802 generated and transmitted by the Bluetooth module 611 may be a signal for waking up the controller 420 to transition the display device 600 from a power-off state to a power-on state. A reason for waking up the controller 420 (or a boot reason) may vary depending on the number of falling edges of the pulsed signal 802. In the disclosure, the display device 600 is booted to a power-on state when the controller 420 wakes up, and thus the reason for waking up the controller 420 may be the same as the boot reason.

For example, a first falling edge 901 of the pulsed signal 802 may correspond to a boot reason 911 corresponding to a power button of a remote controller (not shown), a second falling edge 902 of the pulsed signal 802 may correspond to a boot reason 912 corresponding to a power button of the display device 600, and a third falling edge 903 of the pulsed signal 802 may correspond to a boot reason 913 based on a channel-up or channel-down request. Similarly, fourth and fifth falling edges 904, 905 may correspond to boot reasons 914, 915. Subsequently, a sixth falling edge 906 of the pulsed signal 802 may correspond to a boot reason 916 based on a Bluetooth connection request from an external device.

For example, the pulsed signal 802 having only one falling edge may mean that a power button of a remote controller (not shown) for remotely controlling the display device 600 is pressed and thus booting is required. As another example, the pulsed signal 802 including six falling edges may mean that a Bluetooth connection request is received from an external device and thus booting is required to perform Bluetooth connection to the external device.

Referring back to FIG. 8, the Bluetooth module 611 may transmit, to the controller 420, a pulsed signal corresponding to the A2DP connection request 801, e.g., the pulsed signal 802 including six rising edges, and the controller 420 may wake up based on the transmitted pulsed signal.

The display device 600 may be in a LPM mode before the controller 420 wakes up, and transition to a HCI mode after the controller 420 wakes up. When the display device 600 transitions to the HCI mode, the Bluetooth processor 613 is supplied with power and thus starts to operate.

The Bluetooth communicator 610 may transmit, to the controller 420, a background power-on reason (specifically, the above-described 'boot reason'). Then, the controller 420 may obtain the connection information for Bluetooth connection to an external device such as the mobile phone 451, based on the above-described reason, and perform Bluetooth connection to the mobile phone 451.

For example, the Bluetooth processor 613 may query a POWER_ON_REASON 804 to the Bluetooth module 611, and the Bluetooth module 611 may transmit a boot reason 805 to the Bluetooth processor 613 in response to the query. Herein, the Bluetooth processor 613 may query the POWER_ON_REASON 804 to the Bluetooth module 611 using a vendor specific command (VSC).

The Bluetooth module 611 may transmit information for Bluetooth connection of the external device, for example, the mobile phone 451 having transmitted the A2DP connection request 801, e.g., a Bluetooth address (BT Addr) 806 and/or a BT MAC address of the mobile phone 451. Herein, the information (e.g., the BT Addr 806) for Bluetooth connection of the mobile phone 451 having transmitted the boot reason 805 and the A2DP connection request 801 may be received by the Bluetooth module 611 simultaneously with or subsequently to the A2DP connection request 801.

The Bluetooth processor 613 may transmit the obtained boot reason 805 to the controller 420. The controller 420 may perform Bluetooth connection to an external device such as the mobile phone 451, based on the received background power-on reason, for example, the boot reason 805. For example, the boot reason 805 may include a reason indicating that booting is required for Bluetooth connection for audio transmission, and thus the controller 420 performs operations for Bluetooth connection, based on the obtained boot reason 805. For example, the controller 420 accesses the mobile phone 451 through the Bluetooth module 611 and completes Bluetooth connection between the mobile phone 451 and the display device 600 based on the obtained boot reason 805. Because a legal authentication procedure for Bluetooth connection has been performed and Bluetooth connection has been legally completed between the display device 600 and the external device 450 before the current timing, the controller 420 may omit an authentication procedure for Bluetooth connection. That is, the controller 420 may immediately complete Bluetooth connection without performing Bluetooth authentication on the mobile phone 451.

The above-described Bluetooth connection is for audio transmission, e.g., sound mirroring, and thus the controller 420 may automatically perform sound mirroring. As such, the display 440 of the display device 600 may output a screen 850 including a menu screen corresponding to sound mirroring.

The history of performing Bluetooth connection may be extended to a history of legally completing wireless connection to and being paired with the display device 600. That is, in the display device 600 according to an embodiment of the disclosure, when a history of being paired with an external device based on wireless connection, e.g., Wi-Fi connection, for audio transmission is present, the Bluetooth module 611 of the display device 600 may transmit, to the external device, a response indicating acceptance of the A2DP connection request 801, and operate to wake up the controller 420 to a state requiring Bluetooth connection.

As described above, in an embodiment of the disclosure, although the display device 600 is in a power-off state, when an A2DP connection request is received from the mobile phone 451, the Bluetooth communicator 610 performs an operation for Bluetooth connection without ignoring the A2DP connection request. Therefore, even when the display device 600 is in a power-off state, the user may rapidly and conveniently use a sound mirroring service between the mobile phone 451 and the display device 600.

Figure 10:
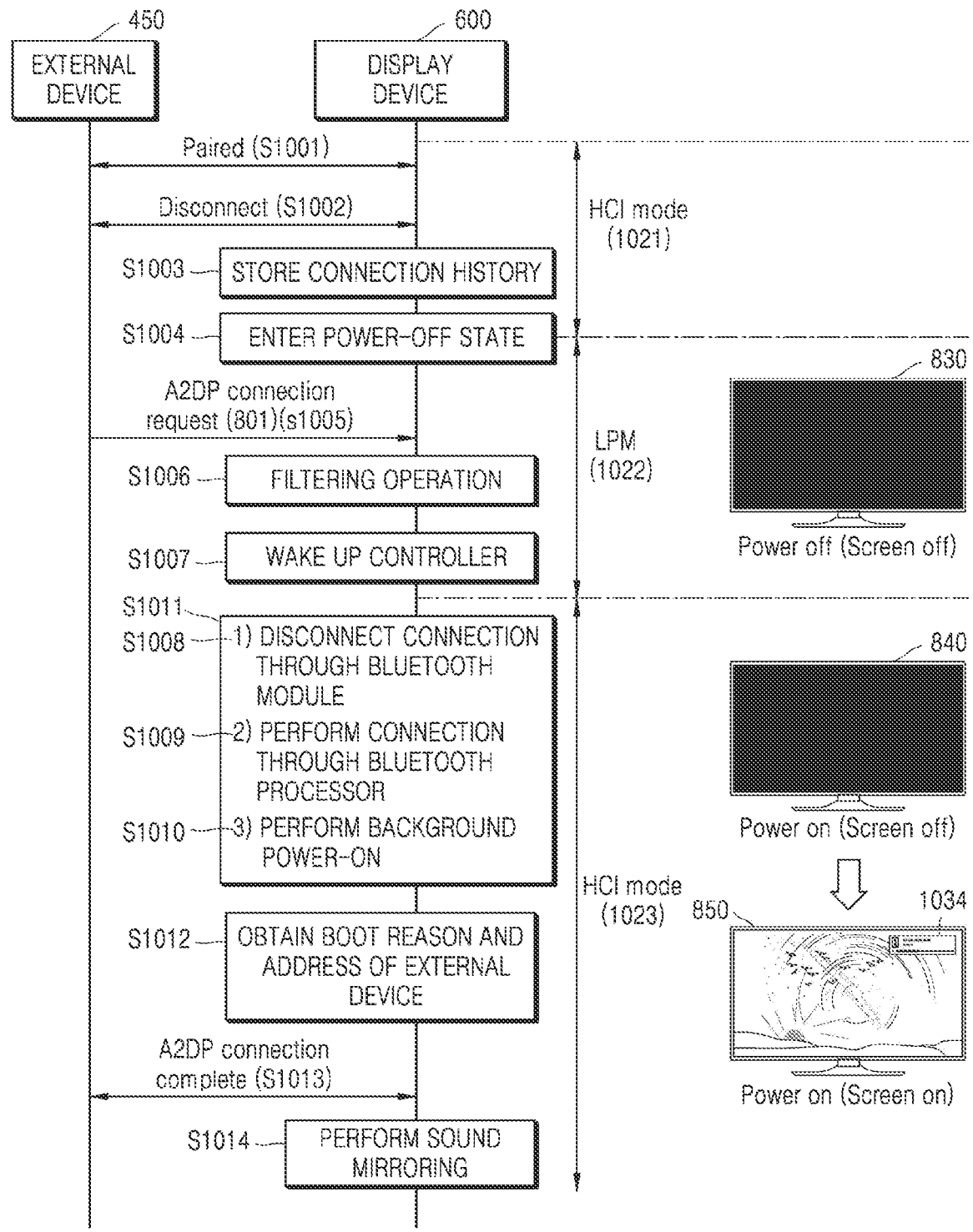
FIG. 10 is a signal flow diagram illustrating an example Bluetooth connection operation performed according to an embodiment of the disclosure.

FIG. 10 is a signal flow diagram illustrating an example Bluetooth connection operation performed in an embodiment of the disclosure. In FIG. 8 and FIG. 10, like reference numerals denote like elements.

For example, in FIG. 10, the display device 600 according to an embodiment of the disclosure may perform communication for audio transmission, with the external device 450 through a Bluetooth network. Herein, the external device 450 may include the above-described the mobile phone 451.

As in FIG. 8, in FIG. 10, a current timing may correspond to a timing at which the A2DP connection request 801 is received.

Referring to FIG. 10, before the current timing, legal Bluetooth connection is performed between the external device 450 and the display device 600 (S1001). That is, before the current timing, the external device 450 and the display device 600 have a history of legally performing pairing and then disconnecting the Bluetooth connection therebetween (S1002).

The display device 600 may control history information corresponding to Bluetooth connection in operation S1001, to be stored in each of the Bluetooth module 611 and the Bluetooth processor 613 (S1003).

The display device 600 may enter a power-off state (S1004). Before the display device 600 enters the power-off state, the display device 600 is in a power-on state and thus may operate in a HCI mode 1021.

At the current timing, the display device 600, for example, the Bluetooth module 611 may receive the A2DP connection request 801 from the external device 450 (S1005).

The display device 600, for example, the Bluetooth module 611 may perform a filtering operation for determining whether to respond to the A2DP connection request 801 (e.g., the operation of determining whether a history of performing Bluetooth connection between the display device 600 and an external device such as the mobile phone 451 is present, which is described above in relation to FIG. 8) (S1006).

Based on the result of operation S1006, the Bluetooth module 611 may transmit, to the mobile phone 451, a response indicating acceptance of the A2DP connection request 801. Based on the result of operation S1006, the Bluetooth module 611 wakes up the controller 420 (S1007). Operation S1007 corresponds to the wake-up operation described above in relation to FIG. 8, e.g., 'the operation in which the pulsed signal 802 for waking up the controller 420 is transmitted to the controller 420 and thus the controller 420 wakes up', and thus a detailed description thereof will not be repeated here.

The display device 600, for example, the controller 420 may control operations illustrated in block S1011, to be performed.

For example, the display device 600, for example, the controller 420 performs a background power-on (or background boot) operation (S1010). The background power-on operation corresponding to operation S1010 equally corresponds to the background boot operation 803 described in detail above in relation to FIG. 8, and thus a detailed description thereof will not be repeated here.

The display device 600 may perform operations S1008 and S1009 simultaneously with the background power-on operation.

In an embodiment of the disclosure, the Bluetooth module 611 may perform an operation related to Bluetooth connection, in a LPM mode. The Bluetooth processor 613 may perform an operation related to Bluetooth connection, in a HCI mode.

For example, the Bluetooth module 611 wakes up the controller 420, and disconnects the Bluetooth connection to the external device 450 (S1008). The Bluetooth processor 613 may perform an operation for Bluetooth connection to the external device 450. Herein, operations S1008 and S1009 may be performed under the control of the controller 420.

For example, when an operation mode of the display device 600 transitions from a LPM mode 1022 to a HCI mode 1023, previous Bluetooth communication or connection may be no longer maintained after the transition timing. Therefore, the operations for Bluetooth communication or connection, which are performed by the Bluetooth module 611 when the display device 600 is in the LPM mode 1022, are terminated. For example, communication connection through the Bluetooth module 611 is terminated.

When the display device 600 transitions to the HCI mode 1023, operations for Bluetooth communication or connection through the Bluetooth processor 613 are started.

Although not shown in FIG. 10, the controller 420 may transmit, to the external device 450, information indicating that the above-described disconnection operation (S1008) and the reconnection operation (S1009) are performed.

For example, the controller 420 of the display device 600 may transmit, to the external device 450, information indicating that an operation for reconnection (S1009) is performed after the Bluetooth communication is disconnected (S1008).

The controller 420 of the display device 600 may obtain the boot reason 805 and the connection information (e.g., 'external device address') 806 for Bluetooth connection to the external device 450 (S1012). The external device address may be a Bluetooth address (BT Addr) 806. Operation S1012 corresponds to the operation of obtaining the boot reason 805 and the connection information 806, which is described above in relation to FIG. 8, and thus a detailed description thereof will not be repeated here.

As such, the controller 420 may perform and complete Bluetooth connection between the external device 450 and the display device 600 (S1013).

The display device 600 may perform sound mirroring through the Bluetooth connection (S1014).

For example, the display device 600 is in a power-on state and thus operates in a HCI mode. The controller 420 may obtain a BT MAC address as the connection information 806 for Bluetooth connection. Under the control of the controller 420, the Bluetooth communicator 610 accesses the external device 450 based on the BT MAC address to complete Bluetooth connection between the display device 600 and the external device 450. The Bluetooth connection between the display device 600 and the external device 450 may be referred to as a 'BT A2DP connection'. The display 440 of the display device 600 transitions to a screen-on state to output a certain screen, and the display device 600 starts a sound mirroring service. For example, the controller 420 of the display device 600 may control the screen 850 including a menu screen 1034 corresponding to sound mirroring, to be displayed.

The controller 420 may transmit a music play command according to the audio/video remote control profile (AVRCP), to the external device 450 in such a manner that mirrored music may be automatically reproduced when Bluetooth connection (or BT A2DP connection) between the display device 600 and the external device 450 is completed. The AVRCP profile may be a profile used to remotely control audio data (music) transmitted according to the Bluetooth A2DP profile, and may be used to remotely control functions such as autoplay, auto-advance, and volume control, or the like.

The external device 450 may transmit audio data to be mirrored, to the display device 600 in response to the music play command transmitted from the display device 600. As such, the display device 600 may reproduce the music.

Figure 11:
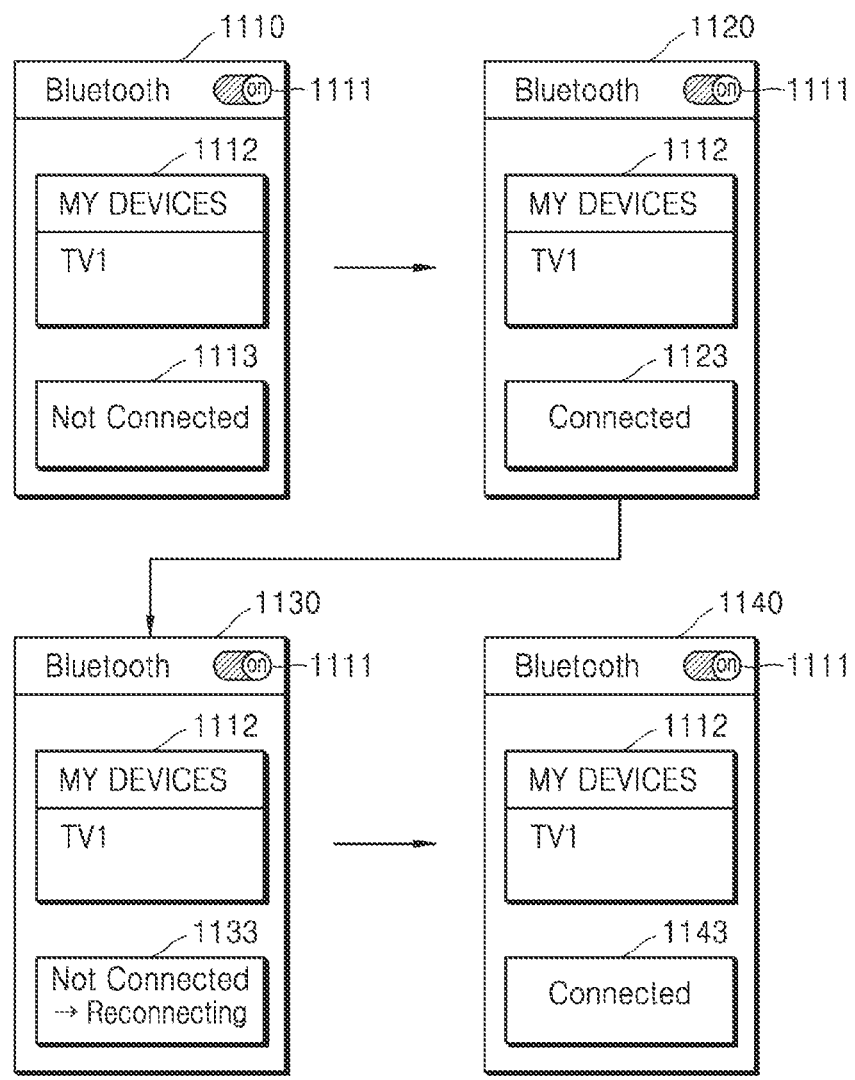
FIG. 11 is a diagram illustrating example user interface (UI) screens outputtable on an external device while a Bluetooth connection operation between the display device and the external device is being performed, according to an embodiment of the disclosure.

FIG. 11 is a diagram illustrating example UI screens outputtable on the external device 450 while a Bluetooth connection operation between the display device 600 and the external device 450 is being performed, according to an embodiment of the disclosure.

In addition to the elements illustrated in FIG. 4, the external device 450 illustrated in FIG. 4 may further include a display (not shown). The display included in the external device 450 corresponds to the display 440 of the display device 600 according to an embodiment of the disclosure, and thus a detailed description thereof will not be repeated here.

The external device 450 may receive, from the display device 600, information indicating that an operation for reconnection (S1010) is performed after Bluetooth communication to the external device 450 is disconnected (S1008). As such, the external device 450 may output a UI screen corresponding to the received information.

FIG. 11 illustrates UI screens 1110, 1120, 1130, and 1140 respectively output on the external device 450 at temporally consecutive timings t1, t2, t3, and t4.

Referring to FIG. 11, the external device 450 may output, at the timing t1, the UI screen 1110 for Bluetooth connection to the display device 600. The UI screen 1110 may include a menu 1112 indicating a display device selected for Bluetooth connection, and a menu 1113 indicating a connection status. When a user switches on Bluetooth connection by manipulating a key 1111 to perform Bluetooth connection between the external device 450 and the display device 600, the external device 450 transmits the A2DP connection request 801 to the display device 600 in response to the user input.

At a timing at which the user input for Bluetooth connection to the display device 600 is received, Bluetooth connection between the external device 450 and the display device 600 is not performed. Therefore, the external device 450 may output information indicating that Bluetooth connection is not performed, e.g., 'Not Connected', on the menu 1113.

Subsequently, the timing t2 corresponds to a timing at which the external device 450 receives, from the display device 600, a response for accepting the A2DP connection request 801. Because the response for accepting the A2DP connection request 801 is received, the external device 450 may recognize that Bluetooth connection to the display device 600 is performed, and thus output information indicating that Bluetooth connection is performed, e.g., 'Connected', on a menu 1123.

The timing t3 may correspond to a timing at which the operations of block S1011 illustrated in FIG. 10 are performed. Referring to block S1011, Bluetooth connection through the Bluetooth module 611 in a LPM mode is disconnected (S1008), and Bluetooth connection in a HCI mode is performed (S1009). Therefore, Bluetooth connection may be temporarily lost. The display device 600 may transmit information indicating Bluetooth disconnection and reconnection based on operations S1008 and S1009, in such a manner that the external device 450 does not recognize the temporary loss of Bluetooth connection as an operation error. Then, the external device 450 may output, on a menu 1133, the information indicating Bluetooth disconnection and reconnection based on operations S1008 and S1009.

The timing t4 may correspond to a timing at which Bluetooth connection between the external device 450 and the display device 600 is completed (S1013). Therefore, the external device 450 may output information indicating Bluetooth connection is completed, e.g., 'Connected', on a menu 1143.

Figure 12:
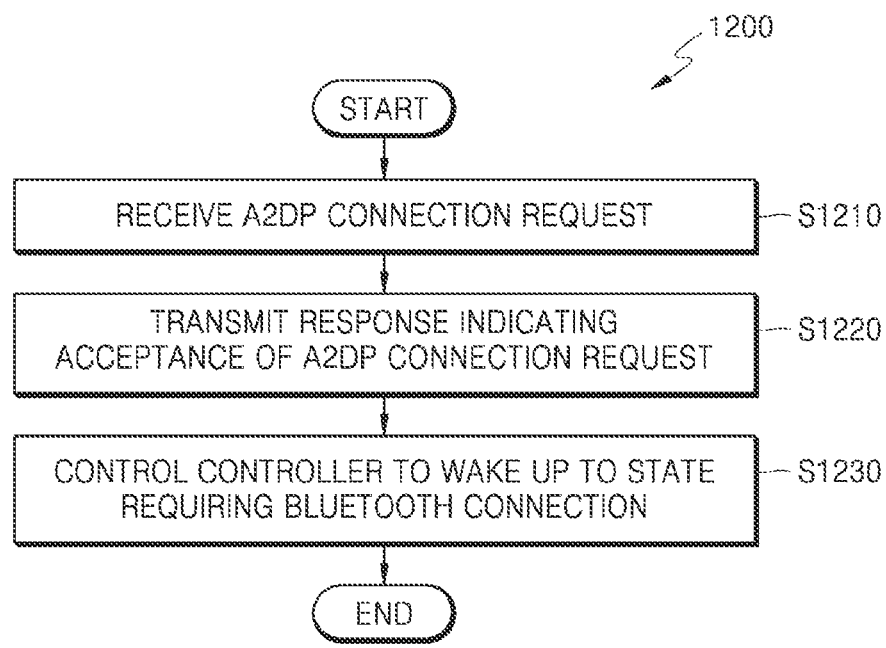
FIG. 12 is a flowchart illustrating an example method of controlling a display device, according to an embodiment of the disclosure.

FIG. 12 is a flowchart illustrating an example method 1200 of controlling a display device, according to an embodiment of the disclosure. FIG. 12 illustrates the flow of the display device operations described above in relation to FIGS. 1 to 11 according to an embodiment of the disclosure.

The method 1200 according to an embodiment of the disclosure may be performed by the display device 100, 400, 600, or 700 described above in relation to FIGS. 1 to 11 according to an embodiment of the disclosure, and the operations performed by the display device 100, 400, 600, or 700 may correspond to steps included in the method 1200. Therefore, the descriptions provided above in relation to FIGS. 1 to 11 will not be repeated here to describe the method 1200. The following description assumes that the steps illustrated in FIG. 12 are performed by the display device 600 illustrated in FIGS. 6 and 8.

The method 1200 may, for example, be a method of controlling the display device 600 including the display 440, the speaker 445, the communicator 410 configured to perform Bluetooth communication, the memory 430 storing one or more instructions, and the controller 420 including at least one processor configured to execute at least one of the one or more instructions.

Referring to FIG. 12, in the method 1200, when the display device 600 is in a power-off state, the communicator 410, for example, the Bluetooth communicator 610 receives, from the external device 450, the A2DP connection request 801 for audio transmission (S1210). For example, the mobile phone 451 may transmit, to the display device 600, the A2DP connection request 801 for audio transmission. As such, the communicator 410 of the display device 600 receives the A2DP connection request 801. The operation of step S1210 may be performed by the Bluetooth module 611 of the Bluetooth communicator 610.

In response to the A2DP connection request 801, the communicator 410, for example, the Bluetooth module 611 of the Bluetooth communicator 610 transmits, to the external device 450, a response indicating acceptance of the A2DP connection request 801 (S1220). The operation of step S1220 may be performed by the Bluetooth module 611 of the Bluetooth communicator 610.

The communicator 410, for example, the Bluetooth module 611 of the Bluetooth communicator 610 controls the controller 420 to wake up to a state requiring Bluetooth connection, in response to the A2DP connection request 801

(S1230). The operation of step S1230 may be performed by the Bluetooth module 611 of the Bluetooth communicator 610.

Figure 13:
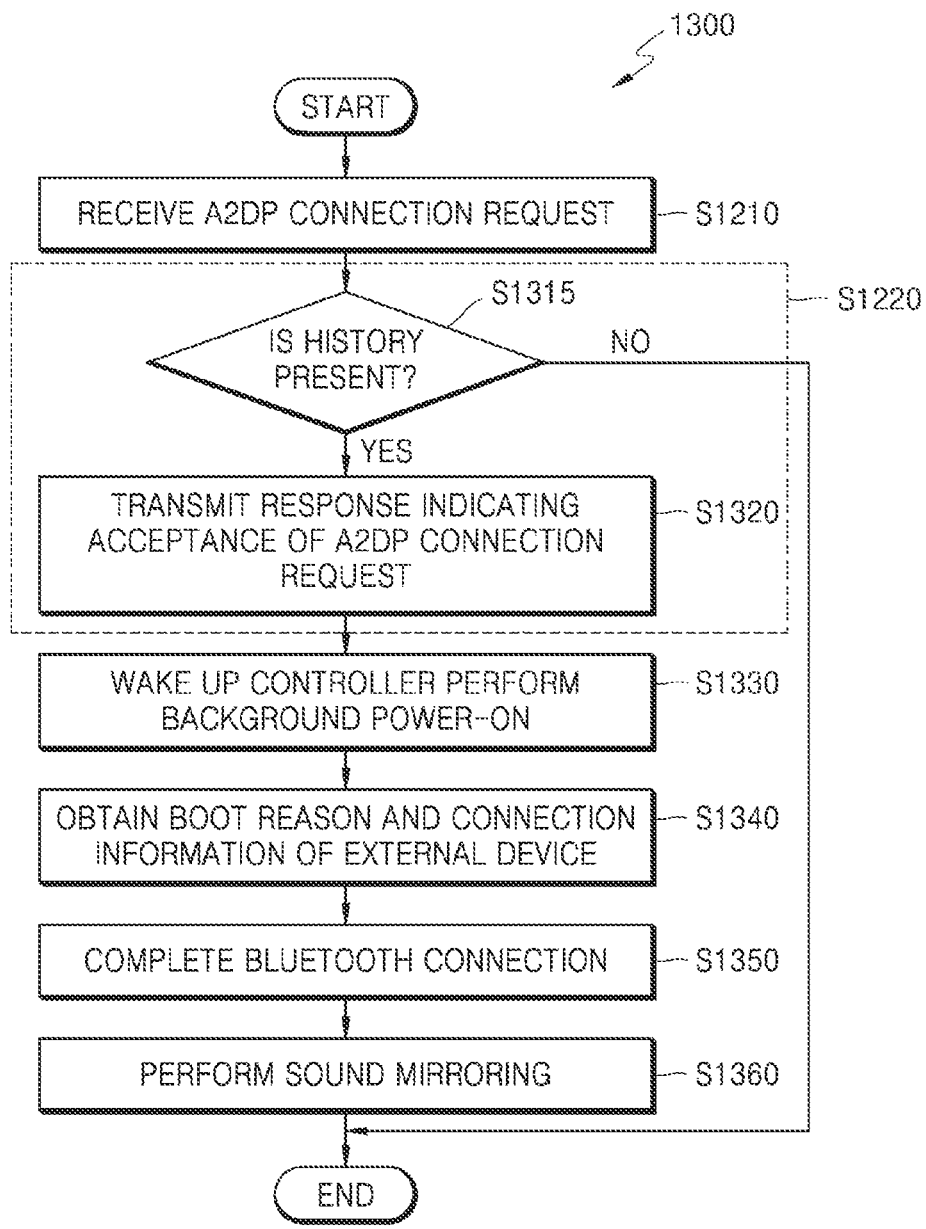
FIG. 13 is a flowchart illustrating an example method of controlling a display device, according to another embodiment of the disclosure.

FIG. 13 is a flowchart illustrating an example method 1300 of controlling a display device, according to another embodiment of the disclosure. FIG. 13 illustrates the flow of the display device operations described above in relation to FIGS. 1 to 11 according to an embodiment of the disclosure.

The method 1300 according to an embodiment of the disclosure may be performed by the display device 100, 400, 600, or 700 described above in relation to FIGS. 1 to 11 according to an embodiment of the disclosure, and the operations performed by the display device 100, 400, 600, or 700 may correspond to steps included in the method 1300. Therefore, the descriptions provided above in relation to FIGS. 1 to 11 will not be repeated here to describe the method 1300. The following description assumes that the steps illustrated in FIG. 13 are performed by the display device 600 illustrated in FIGS. 6, 8, and 10.

The method 1300 is a more detailed version of the method 1200 described above in relation of FIG. 12. Therefore, in the method 1200 of FIG. 12 and the method 1300 of FIG. 13, like reference numerals denote like elements. The operation of step S1330 may correspond to the operation of step S1230 of FIG. 12.

Referring to block S1220 of FIG. 13, in the method 1300, when a history of performing Bluetooth connection between the display device 600 and an external device such as the mobile phone 451 is present (S1315), a response indicating acceptance of the A2DP connection request 801 may be transmitted to the mobile phone 451 (S1320).

The communicator 410, For example, the Bluetooth module 611 of the Bluetooth communicator 610 controls the controller 420 to wake up to a state requiring Bluetooth connection, in response to the A2DP connection request 801 (S1330). For example, the Bluetooth module 611 wakes up the controller 420. The awakened controller 420 performs a background power-on (or background boot) operation.

In step S1330, the waking-up operation corresponds to operation S1007 of FIG. 10, and the background power-on operation corresponds to operation S1010 of FIG. 10. Therefore, a detailed description of the operation of step S1330 will not be repeated here.

The controller 420 of the display device 600 may obtain the boot reason 805 and the connection information (e.g., 'external device address') 806 for Bluetooth connection to the external device 450 (S1340). The operation of step S1340 corresponds to operation S1012 of FIG. 10, and thus a detailed description thereof will not be repeated here.

The controller 420 may perform and complete Bluetooth connection between the external device 450 and the display device 600 (S1350). The operation of step S1350 corresponds to operation S1013 of FIG. 10, and thus a detailed description thereof will not be repeated here.

The display device 600 may perform sound mirroring through the Bluetooth connection (S1360). The operation of step S1360 corresponds to operation S1014 of FIG. 10, and thus a detailed description thereof will not be repeated here.

Based on a method of controlling a display device, and a display device using the method, according to an embodiment of the disclosure, desires of a user to use a sound mirroring service through a display device may be satisfied, and convenience of manipulation for using the sound mirroring service may be increased.

For example, based on a method of controlling a display device, and a display device using the method, according to an embodiment of the disclosure, even when a display device is in a power-off state, Bluetooth connection for audio transmission between the display device and an external device may be performed. As such, desires of a user to use a sound mirroring service through a display device regardless of a state of the display device may be rapidly satisfied.

A method of controlling a display device, according to an example embodiment of the disclosure, may be implemented in the form of program commands that can be executed through various computer means, and may be recorded in a computer-readable recording medium. An embodiment of the disclosure may be implemented in the form of a computer-readable recording medium having recorded thereon one or more programs including instructions for executing the above-described method.

The computer-readable recording medium may store program commands, data files, data structures, or combinations thereof. The program commands recorded on the computer-readable recording medium may be those specially designed and constructed for the purposes of the disclosure, or they may be of the kind well known and available to one of ordinary skill in the art of computer software. Examples of the computer-readable recording medium include magnetic media (e.g., hard disks, floppy disks, and magnetic tapes), optical media (e.g., CD-ROMs or DVDs), magneto-optical media (e.g., floptical disks), and hardware devices (e.g., ROMs, RAMs, or flash memories, etc.) that are specially configured to store and execute program commands. Examples of the program commands include both machine code, such as a code generated by a compiler, and high-level language code that may be a code executable by the computer using an interpreter.

The above-described method of controlling a display device, according to an example embodiment of the disclosure, may be implemented in the form of a computer program product including a recording medium having recorded thereon a program configured to perform an operation of obtaining a multilingual sentence, and an operation of obtaining vector values respectively corresponding to words included in the multilingual sentence, using a multilingual translation model, converting the obtained vector values into vector values corresponding to a target language, and obtaining a sentence of the target language based on the converted vector values.

While various example embodiments of the disclosure have been illustrated and described with reference to the figures, it will be understood by one of ordinary skill in the art that various changes in form and details may be made therein without departing from the scope of the disclosure as set forth, for example, in the following claims.

What is claimed is:
1. A display device, comprising:
a display;
a speaker;
a communicator, comprising communication circuitry, configured to perform wireless communication;
a memory configured to store one or more instructions; and
a controller, comprising at least one processor configured to execute at least one of the one or more instructions,
wherein the communicator is further configured to:
in response to a wireless connection request being received from an external device while the controller is in a first power state in which the display is in a screen-off state, transmit, to the external device, a response indicating acceptance of the wireless connec- tion request to establish a first wireless connection with the external device in the first power state; and
transmit, to the controller, information associated with the external device, and
control to switch a power state from the first power state to a second power state, wherein, the first wireless connection with the external device is disconnected in response to switching the power state of the controller from the first power state to the second power state, and
the controller is further configured to control the communicator to establish a second wireless connection with the external device using at least information associated with the external device.

2. The display device of claim 1, wherein the controller is further configured to:
control the communicator to transmit information, informing that the first wireless connection is disconnected and the second wireless connection is established, to the external device.

3. The display device of claim 1, wherein the communicator is further configured to:
transmit, to the controller, the information associated with the external device such that after the controller is switched to the second power state, the controller is configured to cause the communicator to establish the second wireless connection with the external device using the information associated with the external device.

4. The display device of claim 1, wherein,
the communicator is further configured to cause the display device to perform a background power-on operation, and to transmit, to the controller, the information indicating a reason corresponding to the background power-on operation in response to the wireless connection request being received.

5. The display device of claim 4, wherein,
the wireless communication is Bluetooth communication, and
the wireless connection request is Bluetooth connection request.

6. The display device of claim 5, wherein,
the communicator is further configured to cause the display device to perform a background power-on operation in response to the Bluetooth connection request being received, and
wherein,
in response to the background power-on operation being performed, the controller is configured to perform a Bluetooth connection for sound mirroring, based on a reason corresponding to the background power-on operation.

7. The display device of claim 1, wherein
the wireless communication is Bluetooth communication,
the wireless connection request is Bluetooth connection request,
the communicator comprises a Bluetooth communicator comprising Bluetooth communication circuitry, and
wherein the Bluetooth communicator comprises:
a Bluetooth module comprising Bluetooth communication circuitry configured to transmit and/or receive a Bluetooth signal, and to store first information corresponding to Bluetooth connection information of devices having been Bluetooth-connected to the display device; and
a Bluetooth processor configured to operate in response to the display device being powered on, and to store the first information.

8. The display device of claim 7, wherein
the Bluetooth module is further configured to:
perform an operation related to Bluetooth connection in a low power mode corresponding to the first power state, and
wherein the Bluetooth processor is further configured to:
perform an operation related to Bluetooth connection in a host controller interface mode corresponding to the second power state.

9. A method of controlling a display device, the display device comprising a display, a speaker, a communicator comprising communication circuitry configured to perform wireless communication, a memory configured to store one or more instructions, and a controller comprising at least one processor configured to execute at least one of the one or more instructions, the method comprising:
receiving, by the communicator from an external device, a wireless connection request for transmission of audio from the external device for output by the display device, while the display device is in a first power state in which the display is in a screen-off state;
in response to a wireless connection request being received from the external device, transmitting, by the communicator, to the external device, a response indicating acceptance of the wireless connection request to establish a first wireless connection with the external device in the first power state; and
transmitting, by the communicator, to the controller, information associated with the external device;
controlling the controller to switch a power state from the first power state to a second power state, wherein, by the communicator, the first wireless connection with the external device is disconnected in response to switching the power state of the controller from the first power state to the second power state; and
controlling the communicator to establish a second wireless connection with the external device using the information associated with the external device.

10. The method of claim 9, further comprising:
controlling the communicator to transmit information, informing that the first wireless connection is disconnected and the second wireless connection is established, to the external device.

11. The method of claim 9, further comprising:
transmitting, by the communicator, to the controller, the information associated with the external device such that after the controller is switched to the second power state, and
controlling the communicator to establish the second wireless connection with the external device using the information associated with the external device.

12. The method of claim 9, further comprising:
causing, by the communicator, the display device to perform a background power-on operation, and transmitting, by the communicator, to the controller, the information indicating a reason corresponding to the background power-on operation in response to the wireless connection request being received.

13. The method of claim 12, wherein:
the wireless communication is Bluetooth communication, and
the wireless connection request is Bluetooth connection request.

14. The method of claim 13, further comprising:
causing, by the communicator, the display device to perform a background power-on operation in response to the Bluetooth connection request being received, and in response to the background power-on operation being performed, performing, by the controller, a Bluetooth connection for sound mirroring, based on a reason corresponding to the background power-on operation.

15. The method of claim 9, wherein:

the wireless communication is Bluetooth communication, the wireless connection request is Bluetooth connection request, the communicator comprises a Bluetooth module comprising Bluetooth communication circuitry, and the method further comprises: transmitting and/or receiving, by the Bluetooth module, a Bluetooth signal, and storing, by the Bluetooth module, first information corresponding to Bluetooth connection information of devices having been Bluetooth-connected to the display device; and operating, a Bluetooth processor, in response to the display device being powered on, and storing, by the Bluetooth processor, the first information.

16. The method of claim 15, further comprising:

performing, by the Bluetooth module, an operation related to Bluetooth connection in a low power mode corresponding to the first power state, and performing, by the Bluetooth module, an operation related to Bluetooth connection in a host controller interface mode corresponding to the second power state.

\* \* \* \* \*